US011465396B2

United States Patent
Peiffer et al.

(10) Patent No.: US 11,465,396 B2
(45) Date of Patent: Oct. 11, 2022

(54) BIAXIALLY ORIENTED, HEAT-SEALABLE AND PEELABLE POLYESTER FILM, PROCESS FOR PRODUCTION THEREOF AND USE THEREOF

(71) Applicant: Mitsubishi Polyester Film GmbH, Weisbaden (DE)

(72) Inventors: Herbert Peiffer, Mainz (DE); Stefan Bartsch, Mainz (DE); Martin Jesberger, Mainz (DE); Petr Kolar, Eschborn (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 460 days.

(21) Appl. No.: 15/808,329

(22) Filed: Nov. 9, 2017

(65) Prior Publication Data

US 2018/0134019 A1     May 17, 2018

(30) Foreign Application Priority Data

Nov. 11, 2016   (DE) .......................... 102016222146.9

(51) Int. Cl.
*B32B 27/36*     (2006.01)
*B32B 7/06*     (2019.01)
(Continued)

(52) U.S. Cl.
CPC ................ *B32B 27/36* (2013.01); *B32B 7/06* (2013.01); *B32B 27/08* (2013.01); *B32B 27/20* (2013.01);
(Continued)

(58) Field of Classification Search
None
See application file for complete search history.

(56) References Cited

U.S. PATENT DOCUMENTS 4,252,885 A    2/1981   McGrail et al.
2004/0213967 A1*   10/2004   Peiffer .................... B32B 27/36
                                           428/202
(Continued)

FOREIGN PATENT DOCUMENTS

EP          0144878 A2    6/1985
EP         0 379 190 A2    7/1990
(Continued)

OTHER PUBLICATIONS

"Aliphatic Compound," Encyclopaedia Brittanica, Jan. 2019 (Year: 2019).*

(Continued)

*Primary Examiner* — Frank J Vineis
*Assistant Examiner* — Nicole T Gugliotta
(74) *Attorney, Agent, or Firm* — ProPat, LLC; Cathy R. Moore

(57) ABSTRACT

The present invention relates to a transparent, peelable polyester film incorporating at least one biaxially oriented polyester film (=base layer (B)) and at least one peelable covering layer (A) coated offline thereon, in which the covering layer (A) is at least 85 wt. % made up of a polyester of aromatic and aliphatic dicarboxylic acids and aliphatic diols, and the arithmetic mean value of the absolute ordinate values $S_b$ of the covering layer (A) is less than 300 nm and the reduced peak height $S_{pk}$ of the covering layer (A) is less than 700 nm. The invention further relates to a production process for this peelable film and use thereof as sealing film for APET and/or RPET meal trays.

31 Claims, 5 Drawing Sheets

(51) Int. Cl.
B32B 27/08 (2006.01)
C08J 7/04 (2020.01)
C08J 7/043 (2020.01)
C08J 7/052 (2020.01)
B32B 27/20 (2006.01)
C08J 7/054 (2020.01)
C08J 7/056 (2020.01)

(52) U.S. Cl.
CPC ............ *C08J 7/043* (2020.01); *C08J 7/0427* (2020.01); *C08J 7/052* (2020.01); *C08J 7/054* (2020.01); *C08J 7/056* (2020.01); *B32B 2307/31* (2013.01); *B32B 2307/412* (2013.01); *B32B 2307/518* (2013.01); *B32B 2307/538* (2013.01); *B32B 2307/748* (2013.01); *B32B 2309/105* (2013.01); *B32B 2439/40* (2013.01); *B32B 2439/70* (2013.01); *C08J 2367/00* (2013.01); *C08J 2467/02* (2013.01)

(56) References Cited

U.S. PATENT DOCUMENTS

| | | | | |
|---|---|---|---|---|
| 2005/0019559 | A1* | 1/2005 | Peiffer | B32B 27/20 428/336 |
| 2005/0074598 | A1 | 4/2005 | Peiffer | |
| 2005/0106342 | A1* | 5/2005 | Dawes | B32B 7/02 428/34.9 |
| 2014/0234584 | A1* | 8/2014 | Hyde | C09D 107/00 428/152 |
| 2017/0321024 | A1* | 11/2017 | Roberto | B65D 77/20 |

FOREIGN PATENT DOCUMENTS

| | | |
|---|---|---|
| EP | 1410905 A1 | 4/2004 |
| EP | 1471098 A1 | 10/2004 |
| EP | 1 475 228 B1 | 11/2004 |
| EP | 1529799 A1 | 5/2005 |
| EP | 1884357 A2 | 2/2008 |
| EP | 1942002 A2 | 7/2008 |
| WO | WO 94/13476 A1 | 6/1994 |
| WO | WO 94/13481 A1 | 6/1994 |
| WO | WO 02/059186 A1 | 8/2002 |
| WO | WO 2015/148685 A1 | 10/2015 |
| WO | WO 2016/083521 A1 | 6/2016 |

OTHER PUBLICATIONS

Alhaus, O.E., Verpackung mit Kunststoffen [Packaging with Plastics], Carl Hanser Verlag, p. 271, 1997, ISBN 3-446-17711-6).

Dörsam, E., (Technische Universität Darmstadt, Summer Term 2012), "Printing Technology for Electronics, 4. Ink Transfer in the Printing Process", Jan. 6, 2012.

* cited by examiner

BIAXIALLY ORIENTED, HEAT-SEALABLE AND PEELABLE POLYESTER FILM, PROCESS FOR PRODUCTION THEREOF AND USE THEREOF

CROSS-REFERENCE TO RELATED APPLICATIONS

This application claims priority to German Patent Application 10 2016 222 146.9 filed Nov. 11, 2016, which is hereby incorporated herein by reference in its entirety.

FIELD OF THE INVENTION

The invention relates to a transparent, peelable polyester film consisting of a biaxially oriented base layer (B) and at least one sealable and peelable covering layer (A) applied offline on this base layer (B). The covering layer (A) is heat-sealable and is characterized by a medium to firm peelability, in particular to APET and RPET meal trays (APET=amorphous, transparent polyethylene terephthalate (PET), RPET=at least partly recycled, amorphous, transparent PET). The heat-sealable and peelable covering layer (A) contains polyester based on aromatic and aliphatic acids and aliphatic diols. The invention further relates to a process for production of the film and use thereof.

BACKGROUND OF THE INVENTION

Transparent meal trays of APET/RPET, which are peelably sealed with a film sealed onto the edge of the tray under the action of heat, are used in particular with salads and fresh fruit. Because of their ease of handling, they are enjoying ever greater popularity. This for example manifests itself in the fact that in Europe the growth rates for such product solutions currently lie in the double figure percentage range.

After their preparation, salads or fresh fruit are filled into meal trays. A film which seals the pack and protects the ready meal against external influences is heat-sealed onto the edge of the meal tray.

The heat sealing of the amorphous and transparent meal trays of APET/RPET takes place at sealing temperatures essentially between 110 and 150° C. To ensure profitability, the sealing time is as a rule markedly less than one second. At higher sealing temperatures than 150° C., the APET, but in particular the RPET meal trays are no longer dimensionally stable and tend to warp.

Higher sealing temperatures (>135 to 150° C.) can be used for high grade meal trays of largely regenerated material-free APET with higher wall thicknesses (ca. 200 μm and more). Low sealing temperatures (<135° C.) are in particular used when the meal trays have lower wall thicknesses (ca. 200 μm and less) and have a comparatively high regenerated material content. For the last-named meal trays, the abbreviation RPET is often used.

Irrespective of the sealing temperature used, it is required of the packaging that, even after storage in the refrigerator or in the freezer, the sealed-on film can be easily pulled off the meal tray with application of an appreciable force, without in the process tearing. This behaviour is generally described as "cold peel".

The film according to the present invention is heat-sealable to meal trays of APET and RPET and peelable. With predefined material and predefined total thickness of the film, the sealability and the peelability of the film are mainly determined by the properties of the covering layer (A) which is sealed onto the meal tray.

The peelability of films can relatively easily be determined in the laboratory with a stress-strain tester (e.g. Zwick) (see FIG. 1). For this test, two 15 mm wide and circa 50 mm long strips are cut out of the film and the meal tray and sealed together. The sealing layer of the film (1) forms the layer (A) (3) and the sealing layer of the meal tray (2) the inside layer of the tray. The sealed strips are, as shown in the Figure, clamped into the callipers of the tester. The "angle" between the film clamped in the upper calliper and the meal tray strip is 180°. In this test, the callipers of the tester are driven apart at a speed of 200 mm/min (4), whereby the film should be completely peeled off the meal tray without in the process tearing or indeed splitting.

A peelable film is obtained if the tensile or the peel force (stated in N/15 mm film width) rises to a certain value/plateau and then remains approximately constant over the section over which the two strips are sealed together (see FIG. 2). The film does not start to tear, but instead can be to peeled off the meal tray as desired with defined exertion of force.

The magnitude of the peel force (in N/15 mm) is substantially determined by the polymers used in the heat sealing layer (A) (see FIG. 3), polymer 1 as compared to polymer 2). Apart from this, the magnitude of the peel force is for example dependent on the thickness of the heat sealing layer (A), the heat sealing temperature used and the heat sealing time, and the pressure between the two sealing jaws.

The peel force can for example rise strongly with the heat sealing temperature (see FIG. 3, polymer 1). With increasing heat sealing temperature, however, the risk increases that the sealing layer loses its peelability. That is, a film which is peelable with use of a low heat sealing temperature loses this property when a relatively high heat sealing temperature is used. This rather unfavourable property for use must be taken into account in the design of the sealing layer. The film must be capable of being heat sealed in a sufficiently large temperature range, without the desired peelability being lost in the process (see polymer 2 in FIG. 3). In practice, this temperature range is generally 110 to 150° C., preferably 112 to 150° C. and especially preferably 115 to 150° C. Here, defined conditions, in particular of the sealing times (≤1 s) and the clamping pressures, are used.

According to the present invention, the heat-sealable and peelable layer (A) is applied onto the polyester film (B) by means of offline technology in an additional process step, downstream of the film production. In this method, firstly a polyester film (B) with defined properties is produced by normal processes. In a further processing step, the polyester film (B) thus produced is then coated "offline" with the heat-sealable and peelable layer (A) in a coating unit.

In this process, the heat-sealable and peelable polymer for the layer (A) is firstly dissolved or dispersed in an organic solvent. The ready solution/dispersion is then applied onto the film via a suitable application method (e.g. knife coater (doctor knife), anilox or engraved roller (forward or reverse) or nozzle). In a downstream drying oven, the solvent is evaporated and the peelable polymer remains behind as a solid, peelable layer on the film.

According to the current state of the art, various heat-sealable and peelable polyester films are offered on the market. These films differ in the structure and in the composition of the covering layer (A). Depending on their peel properties, they are used in different applications.

It is for example usual to subdivide the films in terms of use in films with easy peelability (easy peel), with medium firm peelability (medium peel) and with strong peelability (strong peel). The significant quantifiable point of difference between these films is the magnitude of the respective peel force corresponding to FIG. 2. A classification is made here as follows

| | |
|---|---|
| Easy peelability (easy peel) | Peel force in the range from about 2 to 3N per 15 mm strip width |
| Medium peelability (medium peel) | Peel force in the range from about 3 to 7N per 15 mm strip width |
| Strong, resistant peelability (strong peel) | Peel force in the region of more than 7N per 15 mm strip width |

An important criterion here is that when the film is pulled off the meal tray the film itself must not tear or start to tear. During removal, the peelable film must be capable of removal as a whole from the meal tray, without the rest of the dry mass of the coating remaining on the edge of the meal tray. This point is important during the filling of the trays, since at regular intervals the peel behaviour is tested during the filling of the meal trays and the filled product is sealed again. In spite of quality control, the tray with the contents can then be used further, in that this can again be faultlessly sealed. This "reworkability" is very important for the profitability of the product and often decides the choice of the films.

Moreover, high optical requirements are placed on the peelable film by the market, in particular as regards low haze of <20% and high "clarity" of >80%, so that the filled product (e.g. the fresh salad or the fruit) can be clearly recognized. In addition, for the same reasons a good antimisting (antifogging) action of the peelable film is desirable.

Some sealable and peelable PET films are known.

In EP-A 0 379 190, a coextruded, biaxially oriented polyester film is described, which comprises a support film layer of polyester and at least one sealing film layer of a polyester composition. The polymer for the sealing film layer contains two different polyesters A and B, at least one of which (polyester B) contains aliphatic dicarboxylic acids and/or aliphatic diols. The sealing energy, which is measured between two opposing mutually bonded sealing film layers (=fin sealing), is more than 400 $g_{force}$·cm/15 mm (more than 4 N·cm/15 mm).

The film is characterized by good peel properties (with plateau character in the peel diagram) towards itself (i.e. sealing film layer towards sealing film layer).

In EP 1 475 228 B1, a coextruded, peelable, transparent and biaxially oriented polyester film with a base layer (B) and at least one covering layer (A) applied on this base layer (B) is described. The covering layer (A) is heat-sealable and is characterized by easy to firm peelability, in particular towards APET/CPET meal trays. The covering layer (A) contains polyester based on aromatic and aliphatic acids and aliphatic diols. Furthermore, the covering layer (A) contains a polymer incompatible with polyester (anti-PET polymer) in a defined concentration. The film needs improvement in its optical properties and its peel behaviour towards APET meal trays.

In the WO 02/05186 A1, a process for production of peelable films is described, in which the heat-sealable, peelable layer is applied inline onto the polyester film. So-called melt-coating is used, wherein preferably the longitudinally stretched film is coated with the heat-sealable, peelable polymer. The heat-sealable, peelable polymer contains polyester based on aromatic and aliphatic acids, and based on aliphatic diols. The peelable polymers (copolymers) disclosed in the examples have glass transition temperatures of below (minus) −10° C. Such copolyesters are very soft, hence they cannot be oriented in normal roller stretching processes and tend to blocking on the roll. The thickness of the heat-sealable, peelable layer is less than 8 µm. In the document, the melt coating known per se is limited technically by the extrusion coating known per se and by the viscosity of the melt. It is disadvantageous in the process that only comparatively low viscosity polymers (max. 50 Pa*s) with low molecular weight can be used.

Disadvantageous peel properties of the film result from this.

Concerning all the aforesaid inventions, it can be taken that the peel behaviour, in particular the so-called cold peel behaviour and the "reworkability" (see explanation below), is disadvantageous during sealing onto APET meal trays. Apart from this, a so-called "angel hair effect" occurs, in which the coating pulls threads during peeling.

In WO 2015/148685 A1, a coating mixture is claimed, which is dissolved in a solvent and which can be applied on a surface of a packaging film. In this, the coating mixture comprises the following components: a solvent, a heat-sealing polymer of an amorphous or semicrystalline polyester or copolyester with a glass transition temperature between −35 and 0° C. and a "ring and ball" softening point between 60 and 120° C., wherein this polymer is soluble in the said solvents and moreover contains antiblocking additives. When the mixture is coated on a packaging film or a film and dried, it is a heat-sealable coating which can be used in moulding, filling and sealing machines at very low temperature. Films according to this invention tend on storage of the roll to seal with themselves on account of the low glass transition temperature. Hence they cannot be pulled off from the roll without damage.

In WO 2016/083521 A1, a biaxially oriented polyester film is claimed, which consists of a polyester-based film and a heat-sealable coating. The heat-sealable coating contains one or more amorphous copolyesters based on units of terephthalic acid, naphthalenedicarboxylic acid and at least one diol, wherein the heat-sealable coating contains 20 to 50 wt. % terephthalic acid units and 5 to 25 wt. % naphthalenedicarboxylic acid units. The biaxially oriented and coated polyester film possesses a high tear ratio made of the tearing force measured according to ASTM D-1004 and the total film thickness of at least 37 gf/µm in at least one of the two directions: longitudinal and transverse direction. The films are heat-sealable and peelable towards containers of polyester and aluminium. The invention further relates to a process for production of such films and the use of the film in food packaging. In its peel behaviour towards APET, but in particular towards RPET, meal trays, the film needs improvement. The peel behaviour of the film towards the said materials is too weak (easy peel).

SUMMARY OF ADVANTAGEOUS EMBODIMENTS OF THE INVENTION

The purpose of the present invention was to provide a heat-sealable and peelable, biaxially oriented polyester film provided with an offline coating, which is characterized by outstanding sealing and peel properties towards meal trays, in particular towards meal trays, which consist of APET (amorphous) and RPET (recycled material-containing PET) and do not exhibit the disadvantages of the prior art. It should in particular be characterized by the following points/properties:

It should display firm peelability (medium peel) towards APET and RPET meal trays. The peel force should lie in the range from 3 to 7 N/15 mm.

The heat-sealable and peelable layer should have a minimum sealing temperature towards APET and RPET meal trays of 110° C., wherein the maximum sealing temperature is in general ca. 160° C. (with 0.5 s sealing time and a defined contact pressure (see measurement methods below)).

The film should be economically producible. This means for example also that for production of the base film (layer B) processes usual in the industry can be used.

The optical properties of the film should be very good. This means for example low haze (less than 20%), high clarity (greater than 80%) and high transparency (greater than 90%).

The winding behaviour and the processability of the film, in particular during and after coating, during printing, in general during transport at elevated temperatures, during lamination or during the sealing of the coated film onto the meal tray should be good. The film should be windable and unwindable, without blocking and without adhering, e.g. during cutting of the parent roller into smaller cutter rolls or during unwinding of the cutter rolls during processing at the end clients' premises.

In addition, care should be taken that the film can be processed on high-speed machines. Also, at the same time, the characterizing properties of the biaxially oriented polyester films used should not deteriorate. These in particular include the mechanical properties of the film. The E modulus of the coated film should be greater than 3000 N/mm² and the shrinkage of the coated film should be not greater than 2.5%.

DETAILED DESCRIPTION OF ADVANTAGEOUS EMBODIMENTS OF THE INVENTION

Figure 1:
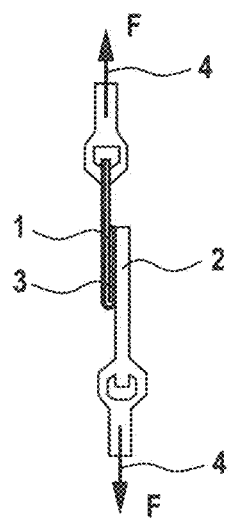
FIG. 1 is a schematic illustration of a test strip of an exemplary meal tray within in a tensile strain test device at a peel angle of 180°, and its mode of operation.

The problem is solved by the provision of a transparent, heat-sealable and peelable polyester film containing a biaxially oriented base layer (B) provided with an offline coating and a heat-sealable covering layer (A) peelable towards APET and RPET meal trays coated onto this, wherein the heat-sealable and peelable covering layer (A) either comprises or consists of a) 85-99 wt. % peel polyester and
b) 1-15 wt. % of other substances, wherein
c) the dicarboxylic acid component of the peel polyester is made up of 25-95 mol. % of units which derive from at least one aromatic dicarboxylic acid and 5-75 mol. % of units which derive from at least one aliphatic dicarboxylic acid, wherein the sum of the units derived from these dicarboxylic acids comes to 100 mol. % and
d) the diol component of the peel polyester is made up of at least 10 mol. % of units which are derived from linear or branched diols with more than 2 C atoms, wherein the sum of all diol components comes to 100 mol. % and
e) the arithmetic mean value of the absolute ordinate values $S_a$ of the covering layer (A) is less than 300 nm and the reduced peak height $S_{pk}$ of the covering layer (A) is less than 700 nm.

In the foregoing, as in what follows, unless otherwise stated, wt. % always relates to the particular layer or the particular system regarding which the problem is stated.

Covering Layer (A)

The heat-sealable and peelable covering layer (A) consists predominantly of polyesters which are made up of units which are derived from aromatic and aliphatic dicarboxylic acids.

The units derived from the aromatic dicarboxylic acids are contained in the peel polyester in a quantity of 25-95 mol. %, preferably 40-90 mol. %, especially preferably 50-88 mol. %. The units derived from the aliphatic dicarboxylic acids are contained in the peel polyester in a quantity of 5-75 mol. %, preferably 10-60 mol. %, especially preferably 12-50 mol. %, wherein the mol. % data must always add up to 100%. Deviation from the aforesaid ratios according to the invention of aromatic and aliphatic dicarboxylic acids leads inter alia either to insufficient adhesion of the covering layer (A) to the base layer (B) (with too low aromatic content of dicarboxylic acids) or to a peel force or sealing onset temperature (=minimum sealing temperature) not according to the invention.

From 1 up to 15 wt. % of the material of the covering layer (A) consists of other substances such as particles, additives, auxiliary agents and/or other additives commonly used in polyester film technology. As possible further additives for the covering layer (A), antiblocking agents, lubricants, but in particular suitable antifogging agents are used, which are added in defined concentrations to the peel polyester, or to the solution consisting of peel polyester, including further substances and solvents.

The heat-sealable and peelable covering layer (A) is characterized by characteristic features. It has a sealing onset temperature (=minimum sealing temperature) towards APET and RPET meal trays of not more than 115° C., preferably not more than 112° C. and especially preferably not more than 110° C. and a seal seam strength (=peel force) towards APET and RPET meal trays of at least 3.0 N, preferably at least 3.1 N, especially preferably at least 3.2 N (always based on 15 mm film width). The heat-sealable and peelable covering layer (A) has a max. sealing temperature of ca. 160° C., preferably 155° C. and especially preferably 150° C. towards APET and RPET meal trays, whereby in the whole sealing range from 110 to 160° C. a film peelable towards APET and RPET meal trays is obtained.

For the preferred ranges stated above, the peel results can also be described in numerical terms. According to the present studies, the peel results according to the present invention can be correlated with one another by the following relationship between the sealing temperature $\vartheta$ (in ° C.) and the peel force F (in N/15 mm)

$$0.018094 \cdot \vartheta/° C. + 0.5 \leq \text{peel force } F/N \text{ per 15 mm} \leq 0.03 \cdot \vartheta/° C. + 2.5$$

$$120 \leq \vartheta/° C. \leq 150$$

Figure 4:
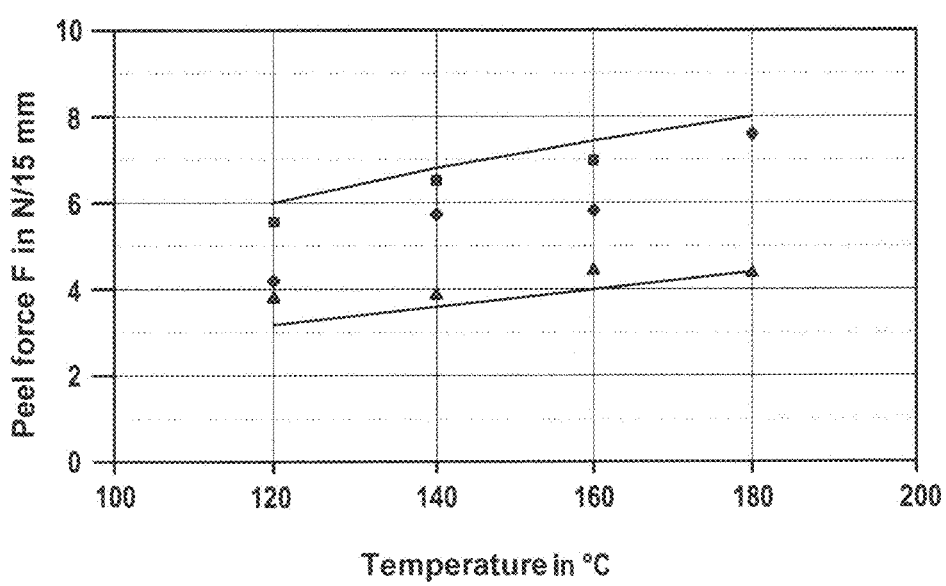
FIG. 4 is a graphical illustration of the relationship between the sealing temperature $\vartheta$ (in ° C.) and the peel force F (in N/15 mm) for advantageous inventive embodiments.

For illustration, this relationship is presented in graph form in FIG. 4.

Base Layer (B)=Biaxially Oriented Polyester Film

The film according to the present invention contains a base layer (B), which is a transparent biaxially oriented polyester film. Onto this, at least one sealable and peelable covering layer (A) according to the invention is applied by off line coating technology.

The base layer (B) is a transparent single or multilayer biaxially oriented polyester film and at least 80 wt. % consists of thermoplastic polyester. Suitable for this are polyesters of ethylene glycol and terephthalic acid (=polyethylene terephthalate, PET), of ethylene glycol and naphthalene-2,6-dicarboxylic acid (=polyethylene 2,6-naphthalate, PEN), of ethylene glycol or 1,3-propylene glycol and 2,5-furandicarboxylic acid (FDCA), of 1,4-bis-hydroxymethylcyclohexane and terephthalic acid (=poly-1,4-cyclohexanedimethylene terephthalate, PCDT) and of ethylene glycol, naphthalene-2,6-dicarboxylic acid and biphenyl-4,4'-dicarboxylic acid (=polyethylene 2,6-naphthalate bibenzoate, PENBB). Preferred are polyesters containing ethylene units, which, based on the dicarboxylate units, at least 90 mol. %, especially preferably at least 95 mol. %, consist of terephthalate or 2,6-naphthalate units. The remaining monomer units derive from other dicarboxylic acids and diols. Advantageously, copolymers or mixtures or blends of the said homo- and/or copolymers can also be used for the base layer (B) (in the statement of the contents for the dicarboxylic acids, the total content of all dicarboxylic acids makes up 100 mol. %. Similarly, the total content of all diols also makes up 100 mol. %.).

Suitable other aromatic dicarboxylic acids are preferably benzenedicarboxylic acids, naphthalenedicarboxylic acids (for example naphthalene-1,4- or 1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, cyclohexanedicarboxylic acids (in particular cyclohexane-1,4-dicarboxylic acid) are to be mentioned. Among the aliphatic dicarboxylic acids, the ($C_3$-$C_{19}$) alkane diacids are particularly suitable, wherein the alkane part can be linear or branched.

Suitable other aliphatic diols are for example diethylene glycol, triethylene glycol, aliphatic glycols of the general formula HO—$(CH_2)_n$—OH, wherein n represents a whole number from 3 to 6 (in particular propane-1,3-diol, butane-1,4-diol, pentane-1,5-diol and hexane-1,6-diol) or branched aliphatic glycols with up to 6 carbon atoms, cycloaliphatic, and optionally heteroatom-containing, diols with one or more rings. Among the cycloaliphatic diols, cyclohexanediols (in particular cyclohexane-1,4-diol) are to be mentioned. Suitable other aromatic diols correspond for example to the formula HO—$C_6H_4$—X—$CH_4$—OH, wherein X stands for —$CH_2$—, —$C(CH_3)_2$—, —$C(CF_3)$—, —O—, —S— or —$SO_2$—. As well as these, bisphenols of the formula HO—$C_6H_4$—$C_6H_4$—OH are also suitable.

It is particularly advantageous if the base layer (B) is a biaxially oriented polyester film which is made up of a copolyester the dicarboxylic acid components whereof are attributable to terephthalic acid-derived units and a small proportion (<5 mol. %) to isophthalic acid-derived units. In this case, the producibility of the film and the optical properties of the film are particularly good. The base layer (B) then essentially contains a polyester copolymer which is predominantly comprised of terephthalic acid and isophthalic acid units and ethylene glycol units (>97 mol. % of diols units).

The production of the polyesters can be effected by the transesterification method. This starts from dicarboxylic acid esters and diols, which are reacted with the usual transesterification catalysts, such as zinc, calcium, lithium and manganese salts. The intermediate products are then polycondensed in the presence of generally usual polycondensation catalysts such as antimony trioxide, titanium oxides or esters and germanium compounds. The production can be effected just as well by the direct esterification method in the presence of polycondensation catalysts. This starts directly from the dicarboxylic acids and the diols.

It has been found particularly advantageous if the intermediate products are polycondensed in the presence of titanium dioxide or germanium compounds, or else the direct esterification method is performed in the presence of polycondensation catalysts such as titanium dioxide or germanium compounds. The biaxially oriented polyester film is thus antimony-free, or at least low in antimony. In the especially preferable case, a biaxially oriented polyester film is desired which contains no antimony and can thus be used in packaging applications in which the film is in direct contact with food.

Heat-Sealable and Peelable Covering Layer (A)

The film according to the present invention is at least two-layer structured. In this case, the film consists of the base layer (B) explained above, and the heat-sealable and peelable covering layer (A) according to the invention applied on this by offline coating technology.

The sealable and peelable covering layer (A) applied by offline coating technology onto the biaxially oriented polyester film=base layer (B) consists predominantly, i.e. at least ca. 85 wt. %, of a peel polyester.

According to the invention, the peel polyester is made up of aromatic and aliphatic dicarboxylic acids and aliphatic diols. The peel polyesters according to the invention can both be blends of homopolyesters and also copolyesters and mixtures of co- and homopolyesters, preferably blends of homo- and copolyesters or blends of various copolyesters based on aromatic and aliphatic dicarboxylic acids and aliphatic diols.

Examples of the aromatic dicarboxylic acids usable according to the invention which can be present as derived units in the peel polyester are terephthalic acid, isophthalic acid, phthalic acid and 2,6-naphthalenedicarboxylic acid. Terephthalic acid and isophthalic acid are preferred.

Examples of the aliphatic dicarboxylic acids usable according to the invention which can be present as derived units in the peel polyester, are succinic acid, glutaric acid, adipic acid, pimelic acid, suberic acid, azelaic acid and sebacic acid. Azelaic acid, sebacic acid and adipic acid are preferred.

Examples of the aliphatic diols usable according to the invention which can be present as derived units in the peel polyester are ethylene glycol, 1,3-propanediol, 1,3-butanediol, 1,4-butanediol, 1,5-pentanediol, 2,2-dimethyl-1,3-propanediol, diethylene glycol, triethylene glycol, 1,4-cyclohexanedimethanol and neopentyl glycol. Ethylene glycol, diethylene glycol, 1,2 propanediol, butanediol and neopentyl glycol are preferred.

In general, the peel polyester contains the following "units derived from dicarboxylic acid" and on the other hand "units derived from diol", each based on the total content of dicarboxylic acid-based, and diol-based repeating units respectively:

- 25 to 85 mol. %, preferably 30 to 80 mol. % and especially preferably 35 to 70 mol. % terephthalate,
- 5 to 50 mol. %, preferably 10 to 45 mol. % and especially preferably 15 to 40 mol. % isophthalate,
- 5 to 50 mol. %, preferably 5 to 40 mol. % and especially preferably 5 to 30 mol. % adipate.
- 0 to 30 mol. %, preferably 0 to 20 mol. % and especially preferably 0 to 10 mol. % azelate,
- 5 to 50 mol. %, preferably 5 to 40 mol. % and especially preferably 5 to 30 mol. % sebacate,
- more than 10 mol. %, preferably more than 11 mol. % and especially preferably more than 12 mol. % ethylene glycol
- one or more diols selected from the group $C_3$ to $C_7$ diols, di-, tri- or tetra-$C_2$ to $C_4$ alkylene glycols, and combinations thereof, in quantities of greater than 10 mol. %. $C_3$ to $C_7$ diols are in particular understood to be: propylene, butylene and neopentyl glycol and the di- to tetra-alkylene glycols in particular to be: diethylene glycol, triethylene glycol or dipropylene glycol.

According to the invention, the glass transition temperature of the peel polyester of the heat-sealable and peelable covering layer (A) lies between 0 and 30° C. The glass transition temperature preferably lies between 0 and 27° C. and especially preferably between 0 and 25° C. If the glass transition temperature of the polyester is less than 0° C., the film cannot reliably be further processed. The tendency of the covering layer (A) to adhere to itself and to the other side of the peel film is then so great that during winding it blocks and can no longer be further processed. The roll sticks together, which is associated with frequent film tearing, in particular during unwinding, of the film. On the other hand, if the glass transition temperature is greater than 30° C., then sealing and in particular the desired peeling of the covering layer (A) at the low temperatures according to the invention (minimum sealing temperature 110° C.) is no longer ensured. In addition, on pulling off the meal tray the film has an increased tendency to tearing internally or tearing away, which is undesirable. The sealing temperatures and glass transition temperatures according to the invention are obtained by observance of the composition according to the invention of the peel polyester (see above).

According to the invention, the SV value of the peel polyester of the heat-sealable and peelable covering layer (A) lies between 200 and 2000. Preferably the SV value lies between 250 and 1900 and especially preferably between 300 and 1900. If the SV value is less than 200, then the required seal seam strength of the covering layer (A) of more than 3 to 7 N/15 mm in the temperature range according to the invention towards APET and RPET meal trays can no longer be adhered to. The peel force is too weak. On the other hand, if the SV value is greater than 2000, then the polyester is too viscous and for example cannot be properly into solution or dispersed in the solvent. Here the determination of the SV value must take place analogously to the process presented in the methods section.

Furthermore, the mass of the dry covering layer (A) of the film according to the invention lies in the range from 1 to 5 $g/m^2$, preferably in the range from 1.1 to 4.8 $g/m^2$ and especially preferably in the range from 1.2 to 4.6 $g/m^2$. If the coating weight of the covering layer (A) is more than 5 $g/m^2$, then the peel force increases markedly and no longer lies in the range according to the invention. In addition, the peel behaviour of the film is impaired, and the film more often tears off on pulling off the meal tray. If on the other hand the thickness of the covering layer (A) is less than 1 $g/m^2$, then the film is no longer heat-sealable and peelable in the temperature range according to the invention.

Antiblocking Agents in the Sealing Layer (A)

To improve the handling of the film, the processability of the film (winding of the film onto/from the roll) on the respective machines (printing and sealing), but also in particular to improve the peel behaviour of the film from the meal tray, it is advantageous to further modify the heat-sealable and peelable covering layer (A).

This is best effected by means of suitable antiblocking agents, which can optionally be added to the sealing layer, namely in quantities such that blocking of the film, in particular on the roll, is prevented, the peel behaviour of the film from the meal tray improved, and the processing behaviour of the film overall is further optimized.

It has been found beneficial if the covering layer (A) contains particles of a defined size, in a defined concentration and optionally of a defined particle size distribution. As well as this, mixtures of two and more different particle systems or mixtures of particle systems of the same chemical composition, but different particle size, can be added to the covering layer (A).

Common antiblocking agents (also referred to as "pigments" or "particles") are inorganic and/or organic particles such as for example calcium carbonate, amorphous silicic acid, talc, magnesium carbonate, barium carbonate, calcium sulphate, barium sulphate, lithium phosphate, calcium phosphate, magnesium phosphate, aluminium oxide, lithium fluoride, calcium, barium, zinc or manganese salts of the derived dicarboxylic acids used in the covering layer A, carbon black, titanium dioxide, kaolin or crosslinked polystyrene or crosslinked polymer particles based on acrylic acid derivatives.

The particles can be added to the covering layer (A) in the respective advantageous concentrations, e.g. as a glycol dispersion during the production of the peel polyester (i.e. during the polycondensation of the peel polyester) or during the lacquer production (after the polycondensation) to the solvent-based precursor system of the covering layer A.

According to the invention, preferred particles are synthetically produced, amorphous $SiO_2$ particles in colloidal form. These particles are excellently incorporated into the polymer matrix and create only a few vacuoles (cavities). Vacuoles can for example arise during the drying of the lacquer, in general they cause an increase in the haze and are therefore not well suited for the present invention. For production of the $SiO_2$ particles, reference is made to the prior art; the process is for example disclosed in detail in EP 1 475 228 B1.

It has been found advantageous to use particles with an average particle diameter $d_{50}$ from 2.0 to 8 μm, preferably from 2.5 to 7 μm and especially preferably from 3.0 to 6 μm.

With use of particles with a diameter which lies below 2.0 µm, a positive effect of the particles for example on the winding of the film onto/from the roll and the peel behaviour of the film from the meal tray are not ensured. In this case, the film once again tends for example during unwinding to tearing or further tearing, which is undesirable. Particles with a diameter greater than 8 µm as a rule cause problems in the processing and application of the lacquer (blocked filters).

In a preferred embodiment, in the heat-sealable and peelable covering layer (A) the diameter ($d_{50}$) of the particles is greater than the thickness of this layer. It has been found beneficial to select a diameter/layer thickness ratio of at least 1.2, preferably at least 1.3 and especially preferably at least 1.4. In these cases, an especially positive effect of the particles in particular on the unwinding behaviour of the film is ensured.

For provision of the desired peel properties and the desired good winding, it has been found beneficial if the heat-sealable and peelable covering layer (A) contains particles at a concentration of 0.1 to 10 wt. %. Preferably, the concentration of the particles is 0.5 to 8.0 wt. % and especially preferably 1.0 to 6.0 wt. %. If on the other hand the covering layer (A) of the film contains particles at a concentration of less than 0.1 wt. %, then a positive effect on the winding of the film is no longer ensured. If on the other hand the covering layer (A) of the film contains particles at a concentration of more than 10 wt. %, then the haze of the film becomes too great.

Furthermore, it has been found advantageous to adjust the arithmetic mean value of the absolute ordinate values t of the heat-sealable and peelable covering layer (A) by appropriate use of the aforesaid particles such that their $S_a$ value is greater than 60 nm. An $S_a$ value of greater than 80 nm is preferable and greater than 100 nm especially preferable.

To obtain the desired low haze, high clarity, gloss and transparency of the peel film, which should also be maintained during the storage of the finished sealed pack, e.g. in the supermarket until use, it is particularly advantageous if the covering layer (A) has good antifogging properties. For this, the covering layer (A) contains suitable antifogging agents in the desired concentration. Suitable antifogging agents are for example surfactants, which is understood to mean molecules which consist of a hydrophobic and a hydrophilic part, they are amphiphilic. Here the surfactants can be nonionic, cationic, anionic or zwitterionic in nature. Furthermore, polymeric surfactants or protective colloids are usable as antifogging agents.

Particularly suitable are anionic surfactants, which are preferably selected from the group of the alkyl sulphates, alkylbenzene sulphates, alkyl ether sulphates or sulphosuccinate esters. Quite especially preferable are surfactants, which are selected from the group of the sulphosuccinate esters (sodium dioctyl sulphosuccinate), e.g. diethyl hexylsulphosuccinate sodium salt, lauryl sulphate sodium salt.

The antifogging agent is used at a concentration of 0.01-5 wt. %, preferably 0.03-4.0 wt. % in the covering layer (A), wherein the magnitude of the concentration of the surfactant is in particular determined by the desired antifogging properties. Good antifogging/antimisting properties of the surface of covering layer (A) are achieved when formation of fine droplets on the surface is not observed and at the same time the wash-off resistance of the coating is good.

A minimum requirement for good antimisting properties is a high surface tension, in other words a low contact angle of the surface of covering layer (A). The antimisting properties are sufficiently good if the surface tension of the covering layer (A) is at least 55 mN/m, preferably at least 58 mN/m and especially preferably at least 61 mN/m.

In the offline coating process, the covering layer (A) is applied onto the base layer (B) in the form of a liquid coating composition, i.e. as lacquer. For the production of the lacquer, it has been found advantageous to dissolve the "solid components" such as the peel polymer(s) and the content of further substances such as for example the antiblocking agents and/or antifogging agents in an organic solvent. During this, the coating components can each be individually dissolved or dispersed and then the respective solutions or dispersions mixed together, or taken all at once and then dissolved/dispersed in the solvent. In a preferred embodiment, a solvent mixture of ethyl acetate (EA) and methyl ethyl ketone (MEK) is used as the continuous phase in the production of the lacquer. Here the MEK content is up to 50 wt. %, preferably up to 40 wt. % and especially preferably up to 30 wt. % based on the total mass of the solvent mixture. In an especially preferable embodiment, exclusively EA is taken as the continuous phase.

With use of the aforesaid solvent, the meeting of foodstuff legislation criteria and limit values is especially facilitated, as a result of which the use according to the invention of the films coated with the lacquer in food packaging is facilitated. Apart from this, through the use of EA, the solvent-based production and disposal costs decrease, which enables particularly economical production of the film according to the invention.

The "solids content" of the lacquer, or the content of substances in the lacquer which are not the solvent, is at least 20 wt. %, preferably at least 23 wt. % and ideally at least 25 wt. %. The maximum limits are defined by the process conditions and encounter their upper limit in the processability of the lacquer. With a solid content of below 20 wt. % the lacquer cannot be applied onto the film over a large area, and uncoated film sections and drying phenomena (coffee stain effect) sometimes occur.

In order to obtain good wetting of the polyester film with the solution and good adhesion of the peel polyester onto the biaxially oriented polyester film, it is advantageous firstly to corona pretreat the surface before coating.

Antiblocking Agents in Base Layer (B)

In order to further improve the processing behaviour of the film according to the present invention, it is advantageous also to incorporate particles into the base layer (B) (i.e. the biaxially oriented polyester film). In this, it has been found beneficial to maintain the following conditions:

a) The particles should have an average particle diameter $d_{50}$ of 1.5 to 6 µm. Here it has been found especially advisable to use particles with an average particle diameter ds, of 2.0 to 5 µm and especially preferably 2.5 to 4 µm.

b) The particles should be present at a concentration of $1 \times 10^{-5}$ to 5 wt. %. Preferably the concentration of the particles is $1.1 \times 10^{-5}$ to 4 wt. % and especially preferably $1.2 \times 10^{-5}$ to 3 wt. %.

The base layer (B), i.e. the biaxially oriented polyester film of the peel film according to the invention, can also itself be monolayer or multilayer in structure. To obtain the aforesaid properties, in particular the required very good optical properties of the peel film, a three-layer structure of the biaxially oriented polyester film (B) with a structure B'B"B' (or E'B"B''') has been found particularly advantageous. The content of particles in the coextruded base layer B" of such a three-layer film should here be set lower than in the two coextruded covering layers B' (or B' and B'''), which are preferably kept the same in structure or can also be different (B' and B''').

In the three-layer biaxially oriented polyester film of the said type (B'B"B') or (B'B"B'"), in the base layer (B") the content of the particles should advisedly lie between 0 and 2.0 wt. %, preferably between 0 and 1.5 wt. %, in particular between 0 and 1.0 wt. %. It has been found particularly advisable to incorporate into the base layer only particles such enter the film via the regenerated material (recycled material) of the same nature. The optical properties of the film, in particular the haze of the film, are then particularly good.

The thickness of the two covering layers B' (or B' and B'") can be the same or different; their thickness is generally between 0.5 and 5 m each.

For the processing of the polymers, but in particular for attainment of the desired very good optical properties of the peel film, it has been found beneficial to select the polymers for the base layer (B") and those for the other layers (B' and/or B'") of the biaxially oriented polyester film such that the viscosities of the respective polymer melts do not differ too much. If this is not the case, additional protrusions/projections, flow disturbances or striation on the finished film are to be expected. For the description of the viscosity ranges of the two melts, a modified solution viscosity (SV value or "solution viscosity") is used.

For normal commercial polyethylene terephthalates which are suitable for the production of biaxially oriented polyester films the SV values lie in the range from 600 to 1000. In order to ensure faultless quality of the film in the sense of the present invention, the SV value of the polymers for the layers B' (or B' and B'") should lie in the range from 500 to 1200, preferably in the range from 550 to 1150, especially preferably in the range from 600 to 1000. It can be taken that the SV values of the polymer melts for the coextruded base layer and the other coextruded layers should differ by not more than 200, preferably not more than 150, but in particular not more than 100 units. In all the said cases, it is moreover very beneficial for the present invention when the viscosities of the two layers (B' and/or B'") are lower than the viscosity of the base layer (B").

The biaxially oriented polyester film (=base layer (B)) can additionally contain normal additives such as stabilizers (UV, hydrolysis), flame retardant materials or fillers. They are advisedly already added to the polymer or to the polymer mixture before melting in the extruder.

The total thickness of the peel film according to the invention can vary within defined limits. It is 3 to 200 μm, in particular 4 to 150 μm, preferably 5 to 100 μm, wherein the layer (B) has a proportion of 45 to 97% of the total thickness.

Process

Biaxially Oriented Polyester Film

Also a subject of the present invention are processes for production of the sealable and peelable peel film comprising firstly the production of the transparent biaxially oriented polyester film (=base layer (B) or (B'B"B') or (B'B"B'")) and the production of the covering layer (A) applied thereon offline as a coating.

The transparent, biaxially oriented polyester film=base layer (B) or base layer with the layer structure (B'B"B' or B'B"B'") is produced by the normal process (e.g. the coextrusion process). According to the invention, the production of a polyester film with the layer structure (B'B"B' or B'B"B'") is preferred, with which a film with high gloss and low haze can especially well be produced. With this preferred three-layer film structure with a base layer (B") and the two covering layers (B') or the covering layers (B' and B'"), the particle concentration in the base layer (B") is preferably lower than that in the two covering layers (B"), or in the covering layers (B' and B'"). The particle concentration in the base layer (B") should be selected such that it has a positive effect on the haze and the gloss of the film. With a three-layer film of the said type, the particle concentration in the base layer (B") will lie between 0 and 0.06 wt. %, preferably between 0 and 0.03 wt. % and in particular between 0 and 0.01 wt. %. The particle diameter of the particles used is in principle not limited, however particles with an average diameter ($d_{50}$) of greater than 1 μm are especially preferable. The concentration of the particles in the covering layers lies between 0.01 and 0.2 wt. %, preferably between 0.02 and 0.16 wt. % and especially preferably between 0.030 and 0.12 wt. % and is essentially determined by the size of the particles used.

In the coextrusion process, for example after the extrusion of the respective melts in separate extruders, these are moulded into flat melt films in a multilayer nozzle and layered over one another. Next, the multilayer film is drawn off and solidified by means of a cooling roller and optionally further rollers. From the process technology viewpoint (thorough mixing of the various components), it has been found especially beneficial here when the extrusion of the polymers at least for the covering layers (B'), or for the covering layers (B' and B'") is performed with a twin-screw extruder with degassing facility(ies). A film is thereby produced which is optically defect-free, for example has no cloud structure or no striations. Such a film is especially amenable to further processing, in particular to printing.

The biaxial stretching of the film is generally performed sequentially. In sequential stretching, stretching is preferably performed first in the longitudinal direction and then in the transverse direction. The stretching in the longitudinal direction can be performed by means of two rollers rotating at different speeds depending on the desired stretch ratio. For the transverse stretching, a suitable tenter frame is generally used.

The temperature, at which the stretching is performed can vary over a relatively wide range and depends on the desired properties of the film. In general, the stretching in the longitudinal direction (machine direction orientation=MDO) is performed in a temperature range from 60 to 130° C. (heating temperatures 60 to 130° C.), and in the transverse direction (transverse direction orientation=TDO) in a temperature range from 90° C. (start of stretching) to 140° C. (end of stretching). The longitudinal stretch ratio lies in the range from 2.0:1 to 5.5:1, preferably from 2.3:1 to 5.0:1. The transverse stretch ratio generally lies in the range from 2.4:1 to 5.0:1, preferably from 2.6:1 to 4.5:1.

Before the transverse stretching, one or both surface(s) of the film can be coated inline by one of the processes known per se. The inline coating can for example lead to improved adhesion between a metal layer or a printing ink and the film, to improvement in the antistatic behaviour or also to further improvement of the barrier properties of the film. Preferably such layers are then applied onto the surface of the biaxially oriented film which is not coated with the sealable and peelable polyester. Onto surface of the film which is coated offline with the peel coating composition, optionally coating can be performed according to the above process inline, e.g. for improved adhesion to the covering layer (A).

According to the invention, for example the film on the surface not to be coated offline can be coated with a functional coating, so that the functional coating has a thickness of 5 to 200 nm, preferably 20 to 150 nm, in particular 30 to 80 nm, on the finished film. Especially preferable is application by the "reverse gravure roll coating" process, in which the coatings can be extremely homogeneously applied in layer thicknesses up to 200 nm. Also preferred is application by the Meyer rod method, with which greater coating thicknesses can be achieved.

The coatings are preferably applied as solutions, suspensions or dispersions, especially preferably as aqueous solution, suspension or dispersion. The coatings impart to the film surface an additional function; for example the film thereby becomes printable, metallizable, sterilizable, antistatic or for example the aroma barriers improve or they enable adhesion to materials which otherwise would not adhere to the film surface.

Examples of substances/compositions which impart additional functionality are: acrylates, as for example described in WO94/13476, ethylene vinyl alcohols, PVDC, waterglass (Na:SiO$_3$), hydrophilic polyester (Na 5-sulphoisophthalic acid-containing PET/IPA polyester, as for example described in EP-A-0144878, U.S. Pat. No. 4,252,885 or EP-A-0296620), polyvinyl acetates, as for example described in WO94/13481, polyurethane, alkali metal or alkaline earth salts of $C_{10}$-$C_{18}$ fatty acids, butadiene copolymers with acrylonitrile or methyl methacrylate, methacrylic acid or esters thereof.

The said substances/compositions are applied onto one or both film surfaces as dilute solution, emulsion or dispersion, preferably as aqueous solution, emulsion or dispersion and the solvent then evaporated. If the coatings are applied inline before the transverse stretching, the heat treatment in the transverse stretching and subsequent heat fixing usually suffices to evaporate the solvent and dry the coating. The dried coatings then generally have layer thicknesses of 5 to 200 nm, preferably 10 to 150 nm, in particular 30 to 100 nm.

In a preferred embodiment of the invention, a copolyester coating is used to achieve better adhesion. The preferred coating copolyesters are produced by polycondensation of (alpha) isophthalic acid, (beta) an aliphatic dicarboxylic acid with the formula

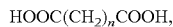

wherein n lies in the range from 1 to 11, (gamma) a sulphomonomer containing an alkali metal sulphonate group on the aromatic part of an aromatic dicarboxylic acid and (delta) at lest one aliphatic or cycloaliphatic alkylene glycol with about 2 to 11, preferably 2 to 8, especially preferably 2 to 6 carbon atoms. The acid equivalents present in total should on the molar basis essentially correspond to the glycol equivalents present in total.

It has been found that the relative contents of the components alpha, beta gamma and delta which are used for production of the preferred copolyester coatings are decisive for obtaining a coated film with satisfactory adhesion. Thus preferably for example isophthalic acid (component alpha) should be present as an acid component to at least about 65 mol. %. Preferably, the component alpha is pure isophthalic acid, which is present in a content of about 70 to 95 mol. %. For the component beta it can be taken that every acid with the stated formula gives satisfactory results, wherein adipic acid, azelaic acid, sebacic acid, malonic acid, succinic acid, glutaric acid and mixtures of these acids are preferred. The desired content within the stated range is preferably 1 to 20 mol. %, based on the acid components of the copolyester, if the component beta is contained in the composition. The monomer forming the component gamma of the preferred copolyester coating should preferably be contained in this system in a quantity of at least 5 mol. %, so that the composition becomes dispersible with water. Especially preferably, the quantity of monomer of the component gamma is about 6.5 to 12 mol. %. The glycol component (delta) is present in approximately stoichiometric quantity.

As described above, the said coating can be applied onto the surface of the film, which is not further coated offline. As well as this, it can however also optionally be applied onto the surface which is coated offline with the peel coating composition. It then contributes to improved adhesion to the covering layer (A).

In a further preferred embodiment of the invention, an acrylate coating is used to obtain the better adhesion. The acrylate copolymers preferably used consist essentially of at least 50 wt. % of one or more polymerized acrylic and/or methacrylic monomers and 1 to 15 wt. % of a copolymerizable comonomer, which in copolymerized state is capable of forming intermolecular crosslinkages under the action of elevated temperature, optionally without addition of a separate crosslinking agent in resin.

The acrylic component of the adhesion-promoting copolymers is preferably present in a quantity of 50 to 99 wt. % and preferably consists of an ester of methacrylic acid, in particular an alkyl ester, the alkyl group whereof contains up to ten C atoms, such as for example the methyl, ethyl, n-propyl, isopropyl, n-butyl, isobutyl, tertiary butyl, hexyl, 2-ethylhexyl, heptyl and n-octyl group. Acrylic copolymers which are derived from a lower alkyl acrylate (C1 to C4), in particular ethyl acrylate, together with a lower alkyl methacrylate result in particularly good adhesion between the polyester film and reprographic coatings and matt coatings applied thereon. Quite especially preferably, adhesion-promoting copolymers of an alkyl acrylate, e.g. ethyl acrylate or butyl acrylate, are used together with an alkyl methacrylate, e.g. methyl methacrylate, in particular in equal molar contents and in a total quantity of 70 to 95 wt. %. The acrylate comonomer of such acrylic/methacrylic combinations is preferably present in a content of 15 to 65 mol. % and the methacrylate comonomers preferably in a content which in general is greater by 5 to 20 mol. % than the content of the acrylate comonomer. The methacrylate is preferably contained in the combination in a content of 35 to 85 mol. %.

To increase the solvent resistance, for the formation of crosslinkages suitable comonomers can optionally be used, such as for example N-methylolacrylamide, N-methylolmethacrylamide and the corresponding ethers; epoxide materials such as for example glycidyl acrylate, glycidyl methacrylate and allyl glycidyl ether; carboxy group-containing monomers such as for example crotonic acid, itaconic acid or acrylic acid; anhydrides such as for example maleic anhydride or itaconic anhydride; hydroxy group-containing monomers such as for example allyl alcohol and hydroxyethyl or hydroxypropyl acrylate or methacrylate; amides such as for example acrylamide, methacrylamide or maleamide and isocyanates such as for example vinyl isocyanate or allyl isocyanate. Among the aforesaid crosslinking comonomers, N-methylolacrylamide and N-methylolmethacrylamide are preferred, first and foremost because copolymer chains which contain one of these monomers are capable of condensing with one another under the action of elevated temperatures and thus forming the desired intermolecular crosslinkages. The optionally desired solvent resistance of the preferred acrylate coating can however also be achieved by the presence of an extraneous crosslinking agent such as for example a melamine or urea formaldehyde condensation product. If solvent resistance is not needed, then crosslinking agents can be omitted.

The preferred acrylate coating can be applied onto the film on one or both sides. It is however also possible to provide only one side of the film with the acrylate coating and to apply a different coating onto the opposite side. The coating formula can contain known additives such as for example antistatic agents, wetting agents, surfactants, pH regulators, antioxidants, dyes, pigments, antiblocking agents such as for example colloidal $SiO_2$ etc. Normally it is appropriate to incorporate a surfactant in order to increase the ability of the aqueous coating to wet the polyester support film.

In a further preferred embodiment of the invention, a water-soluble or hydrophilic coating is used to obtain better adhesion with hydrophilic layers or printing dyes.

The preferred hydrophilic coating can be achieved in three ways:
1. A mixture of an aromatic copolyester (I-1) with a functional group dispersible in water and a polyvinyl alcohol (II-1),
2. A mixture of an aromatic copolyester (I-2) with a functional group dispersible in water and a polyglycerol polyglycidyl ether (II-2), or
3. A mixture of an aqueous polyurethane (I-3) and a polyvinyl alcohol (II-3).

The aromatic copolyesters (I-1 and I-2) are produced from aromatic dicarboxylic acids, such as for example terephthalic acid, 2,6-naphthalenedicarboxylic acid or isophthalic acid, optionally branched or condensed aliphatic diols such as for example ethylene glycol, diethylene glycol, 2-methylpropanol or 2,2-dimethylpropanol and an ester-forming compound which bears a functional group dispersible in water. Examples of the functional groups are: hydroxy, carboxy, sulphonic acid or phosphoric acid groups or salts thereof. Sulphonic acid and carboxylic acid salts are preferred. As the polyvinyl alcohol component (II-1 and II-3) any polyvinyl alcohol which is water-soluble and producible with normal polymerisation techniques can be used. Generally such polyvinyl alcohols are produced by the saponification of polyvinyl acetates. The degree of saponification should preferably be at least 70%, but better 80-99.9%. As polyglycerol polyglycidyl ethers (II-2), reaction products of glycerine and epichlorohydrin with molecular weights ca. 250 and 1200 are used. The aqueous polyurethane (I-3) is formed from a polyol, such as for example polyester with glycol end groups, polyoxyethylene glycol, polyoxypropylene glycol, polyoxytetramethylene glycol or acrylic polyols and a diisocyanate, such as for example xylylene diisocyanate, hexamethylene diisocyanate, 4,4'-dicyclohexylmethane diisocyanate, tolidine diisocyanate, phenylene diisocyanate, 4,4'-diphenylmethane diisocyanate and 1,5-naphthalene diisocyanate.

The preferred copolyester, acrylate and hydrophilic coatings can also contain other known additives, such as for example antistatic agents, wetting agents, surfactants, pH regulators, antioxidants, dyes, pigments, antiblocking agents such as for example colloidal $SiO_2$, etc.

In the subsequent thermofixing, the film is kept at a temperature from 150 to 250° C. over a period of about 0.1 to 10 s. Next the film is wound in the usual manner.

Production of the Covering Layer (A)

The final production of the heat-sealable and peelable polyester film according to the invention is effected offline in a further, independent process step. In this, the peel coating composition is applied wet onto the base film in the desired thickness by normal coating technology.

Normal coating or application technologies are inter alia reverse roll or reverse gravure coating, forward gravure coating (forward gravure), coating by Meyer bar, casting roller coating, coating by flow applicator, curtain coating, spray coating, or coating with a doctor knife (blade coater).

A typical coating unit, also referred to as lacquering unit, essentially consists of an unwinding unit, a corona pretreatment station, one or more application stations, a dryer and a winding unit.

The coating for formation of the covering layer (A) is preferably applied onto the polyester film via a gravure roller which is driven in synchrony with the web (forward gravure). The working width is preferably more than 1000 mm and the machine speed is preferably more than 150 m/min.

Figure 5:
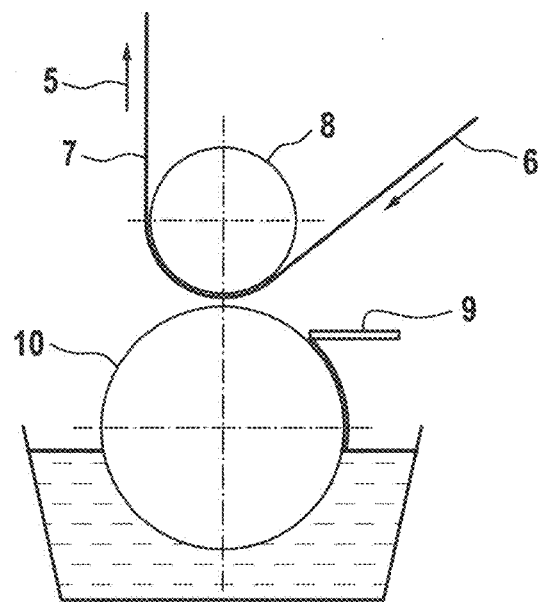
FIG. 5 is a schematic illustration of the structure and mode of operation of suitable coating station for forming exemplary inventive films.

FIG. 5 shows diagrammatically the structure and the mode of operation of such a coating station. The gravure roller (10) has for example a diameter of 200 to 600 mm with a steel core, on which a thin metallic layer is applied, into which gravure wells are impressed mechanically or by laser. Depending on the purpose, the wells can have a different appearance. Typical well geometries are round, square, have a honeycomb structure, and are self-contained or continuous. Furthermore, the well volume is determined by the depth and size of the individual wells, which in turn has a critical influence on the wet application and the coating appearance. Finally, after impression of the wells, the gravure roller (10) is usually chrome-plated. The technology shown in the FIG. 5 is described as "forward gravure". Apart from this, "reverse gravure" can naturally also be used, but it is not preferably used in the present case.

The application of the peel coating composition (corresponds to the wet covering layer (A)) onto the biaxially oriented polyester film (B) (6) is effected via a trough onto the coating roller (10). Excess material is usually scraped off the coating roller (10) with a doctor knife (9). From the coating roller, the peel coating composition is applied onto the polyester film (6), which is passed over an impression roller (8). Next, the coating film (7) is passed on into a drying installation (5).

Figure 6:
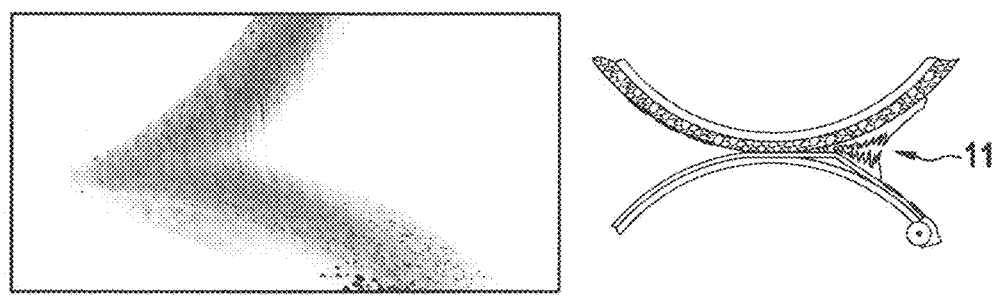
FIG. 6 is a photographic and schematic illustration of ink splitting.

The process thus strongly resembles the normal printing technology, such as for example is described in detail by M. Lake, in "Oberflächentechnik in der Kunststoffverarbeitung" [Surface Technology in Plastics Processing], Hanser 2009. In comparison to printing technology, in the present case the peel coating (in practice also described as lacquer) is applied all over and not partially, as in printing. On the mechanism of transfer of the peel coating from the gravure roller onto the substrate (=biaxially oriented polyester film) reference is made at this point to the lecture by E. Dörsam (Technische Universität Darmstadt, Summer Term 2012), "Printing Technology for Electronics, 4. Ink Transfer in the Printing Process", 1 Jun. 2012. The transfer of the peel coating onto the polyester film in this essentially takes place by ink splitting (11), as is vividly illustrated in FIG. 6, E. Dörsam, 2012.

In order to produce a peel film which is characterized by outstanding winding behaviour, even after storage, the coated film was smoothed on the coating side (covering layer (A)) by a defined process directly after coating, before drying.

For the smoothing of the film surface, a range of different techniques can be used, e.g. smoothing by air knife, use of smoothing rollers (similar to the calendering of films), over which the wet layer is passed, or smoothing by means of so-called "smoothing bars".

Figure 7:
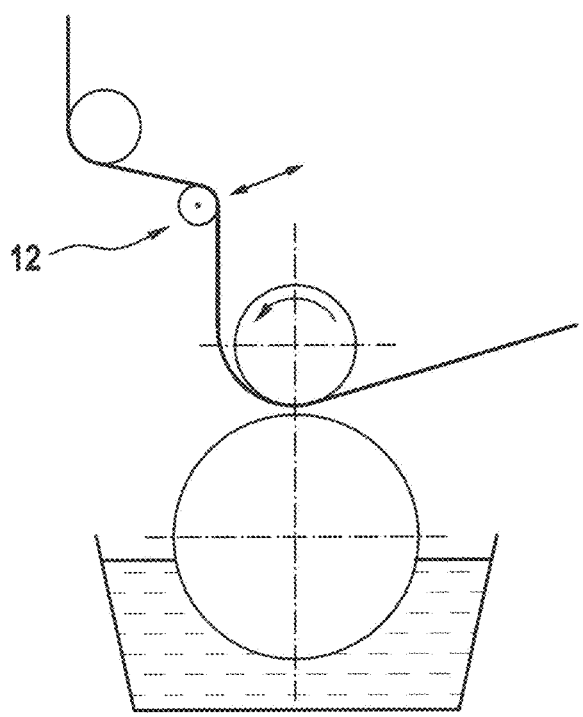
FIG. 7 is a schematic illustration of inventive processes that further include a smoothing bar.

For the production of a film according to the present invention with especially good winding behaviour, the process by means of "smoothing bar" known per se, see FIG. 7 (12), is advantageously used. The "smoothing bar" consists of a rotating roller with a diameter of 2 to 8 cm and a smooth surface, which can be driven in synchrony or in reverse direction.

Furthermore, in the sense of good winding, it has been found advantageous to drive the "smoothing bar" in reverse, with the speed of the "smoothing bar" being about 20 to 200% of the film web speed. Here, the wrap angle of the film can vary within certain limits and is determined inter alia by the viscosity of the peel coating composition. Wrap angles in the range from 0 to 90°, preferably 0 to 45° and especially preferably 0 to 20°, are normal.

Through the smoothing of the coating side of the peel film according to the present invention, a film which is in particular characterized by outstanding winding behaviour, even after storage, is obtained. Such a film according to the invention is characterized by a topography as shown by way of example in FIG. 8.

According to the invention, such films according to the invention are characterized by an arithmetic mean value of the absolute ordinate values S of the covering layer (A) which is less than 300 nm, preferably less than 250 nm and especially preferably less than 200 nm and by a reduced peak height $S_{pk}$, which is less than 700 nm, preferably less than 690 nm and especially preferably less than 680 nm.

Figure 9:
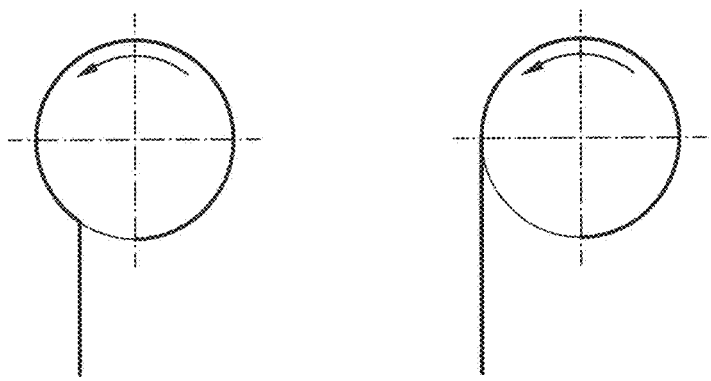
FIG. 9 is a schematic illustration of the unwinding behaviour of exemplary inventive smoothed films (right hand illustration) versus non-smoothed films (left hand illustration)

During the production (coating) and during the further processing (winding and unwinding, cutting) of the peel film according to the invention according to this process, with the previously described smoothing of the covering layer (A), the following was observed
  i) In the winding of the coated film onto the master roll and subsequent test pulling of the peel film from the roll, no unwinding noise is observed. On unwinding, the film falls tangentially off the roll, as shown in FIG. 9, on the right.
  ii) In the further processing of the coated film, e.g. in the cutting of the master roll into small cutter rolls for client use, no adhesion of the film layers to one another was observed, furthermore, during unwinding, the film falls tangentially off the roll and furthermore no unwinding noise was observed.
  iii) The winding behaviour of the finished peel film is very good and fully meets the requirements.
  iv) The dry mass of the coating on the coated film remains completely on the coated side. In particular, no stripping of the dry mass ("cohesive fracture") through transfer onto the back side within a roll takes place.

If, on the other hand, the coating is performed without the subsequent smoothing described, then during the production of the peel film and during the further processing of this film, the following points are observed
  i) In the winding of the coated film onto the master roll and subsequent test unwinding of the peel film from the roll, a pronounced unwinding noise is observed. The film no longer falls tangentially off the roll as shown on the right in FIG. 9, but instead a lag is observed, as shown in FIG. 9, left-hand picture. Increased adhesion between the individual film layers occurs on the roll, which is undesirable.
  ii) During the further processing of the coated film, e.g. during the cutting of the master roll into small cutter rolls for client use, a further intensified adhesion of the film layers to one another is observed, the lag described above becomes markedly greater, and the film can only, if at all, be pulled from the roll with the exertion of force.
  iii) Due to this increased adhesion between the individual film layers, film breaks occur in the machine, which leads to stoppage of the cutting operation. This is undesirable.
  iv) The adhesion to the back side can be so strong that parts of the lacquer layer are torn out and transferred.
  v) The conclusion is that the winding behaviour of the peel film is unsatisfactory and does not meet the requirements.

Figure 10:
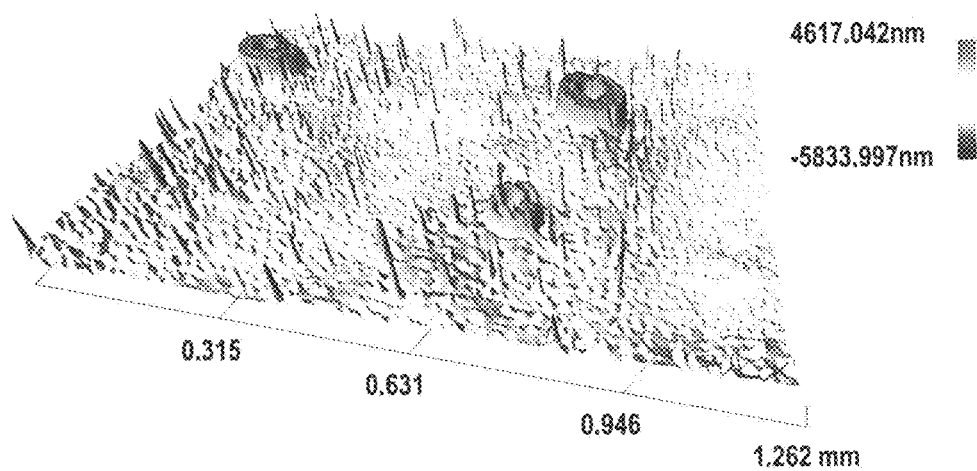
FIG. 10 is an illustrative surface plot of the topography of an exemplary comparative film (i.e. not in accordance with the invention) that has not had its covering layer (A) smoothed.

Such a film, not according to the invention, is characterized by a topography of the covering layer (A) such as is shown by way of example in FIG. 10. In the surface plot of the covering layer (A), as well as the "usual protrusions", additional protrusions can be seen, which are many times greater in their diameter than the peaks surrounding them.

For the production of the peel film according to the invention it is moreover important that during the coating the following criteria are observed.
  i) The temperature of the coating composition (=lacquer) is within defined limits. The temperature of the lacquer (measured in the bath and in the feed tank) is 10 to 40° C., preferably 16 to 28° C. and especially preferably 18 to 25° C. If the temperature of the lacquer is less than 10° C. cloudy structures appear in the coated film, which are undesirable. At a lacquer temperature of greater than 40° C., the coated film is blotchy, which is also undesirable.
  ii) The viscosity of the lacquer lies within a defined range. The viscosity is determined with a DIN 4 flow cup. According to the invention, the viscosity of the lacquer (measured in the bath and in the feed tank) is 10 to 50 s, preferably 16 to 32 s and especially preferably 17 to 30 s. If the viscosity of the lacquer is less than 10 s, then the application is uneven, which manifests itself in high haze variations over the film width and the film length. The variations are undesirable. With a lacquer viscosity of greater than 50 s, the haze of the coated film is markedly increased, which is also undesirable.

Properties According to the Invention

The peel film produced according to the present invention possesses a range of advantageous properties according to the invention, the most important of which are listed below.

The gloss of the film surface not coated offline is greater than 100, in the preferred embodiment greater than 110 and in the especially preferred embodiment greater than 120. The non-coated film surface is therefore suitable in particular for a further functional coating, for printing or for metallization. The gloss of the film surface coated offline with the polyester according to the invention is greater than 70, in the preferred embodiment greater than 75 and in the especially preferred embodiment greater than 80.

The clarity of the film according to the invention is greater than 80%. In a preferred embodiment the clarity of the film is more than 82% and in an especially preferred embodiment more than 84%. The haze of the film according to the invention is less than 20%. In a preferred embodiment, the haze of the film is less than 18% and in an especially preferred embodiment less than 15%. The transparency of the film according to the invention is greater than 90%. In a preferred embodiment, the transparency of the film is more than 90.5% and in an especially preferred embodiment more than 91%.

The peel properties of the film according to the present invention are outstanding. The film exhibits firm peelability (medium peel) towards APET and RPET meal trays. In the temperature range from 110 to 160° C., the peel force lies in the desired range of 3 to 7 N/15 mm. In addition, it has surprisingly been found that the film according to the invention also peels very well opposite CPET and ACPET meal trays and meal trays of cardboard which are covered with an APET layer; here also, the film exhibits the desired firm peelability in all cases.

Furthermore, the film has faultless "cold peel behaviour". It is moreover "reworkable" which is economically very advantageous. Furthermore, the sealing seam exhibits high integrity, i.e. it is for example water and olive oil-resistant and passes the so-called water and olive oil test.

in particular naturally improves the "reworkability" and the appearance of the meal tray that remains.

The film according to the invention is outstandingly suitable for the packaging of foods and luxury foods, in particular in the packaging of foods and luxury foods in meal trays with which peelable polyester films for opening the pack are used.

The following Table (table 1) once again summarizes inter alia the most important film properties according to the invention.

TABLE 1

| Covering layer (A) | Advisable range according to the invention | Preferred | Especially preferred | Unit | Measurement method |
|---|---|---|---|---|---|
| Polyester content | 85 to 99 | 86 to 99 | 87 to 99 | Wt. % | |
| Content of units in the polyester made up of aromatic dicarboxylic acids | 25 to 95 | 40 to 90 | 50 to 88 | Mol. % | |
| Content of units in the polyester made up of aliphatic dicarboxylic acids | 5 to 75 | 10 to 60 | 12 to 50 | Mol. % | |
| Content of other substances | 1 to 15 | 1 to 14 | 1 to 13 | Wt. % | |
| Polyester glass transition temperature | 0 to 30 | 0 to 27 | 2 to 25 | ° C. | in-house |
| Polyester SV value | 200-2000 | 250-1900 | 300-1900 | | in-house |
| Mass of the dry covering layer (A) | 1-5 | 1.1-4.8 | 1.2-4.6 | g/m² | in-house |
| Particle diameter $d_{50}$ | 2.0 to 8 | 2.5 to 7 | 3.0 to 6 | µm | in-house |
| Filler concentration | 0.5 to 10 | 0.7 to 8.0 | 1.0 to 6.0 | % | in-house |
| Properties | | | | | |
| Thickness of the film | 3 to 200 | 4 to 150 | 5 to 100 | µm | |
| Minimum sealing temperature of CL (A) towards APET and RPET meal trays | 110 | 112 | 115 | ° C. | in-house |
| Seal seam strength of CL (A) towards APET and RPET meal trays | 3 to 7 | 3.1 to 7 | 3.2 to 7 | N/15 mm | in-house |
| Cold peel behaviour | medium peel | medium peel | medium/strong peel | | in-house |
| Arithmetic mean value of the absolute ordinate values $S_a$ | <300 | <250 | <200 | nm | DIN EN ISO 25178-2 |
| Reduced peak height $S_{pk}$ | <700 | <690 | <680 | nm | DIN EN ISO 25178-2 |
| Gloss of the not offline coated surface | >100 | >110 | >120 | | DIN 67530 |
| Gloss of the offline coated surface | >70 | >75 | >80 | | DIN 67530 |
| Clarity of the film | >80 | >82 | >84 | % | ASTM D 1003 |
| Haze of the film | <20 | <18 | <15 | % | ASTM D 1003-61, Method A |
| Transparency of the film | >90 | >90.5 | >91 | % | |
| Shrinkage of the film | <2.5 | <2.2 | <2.0 | % | DIN 40634, 150° C., 15 min. |
| E modulus of the film | >3000 | >3500 | >4000 | | ISO527-1 and ISO 527-3; Sample type 2 |

Figure 8:
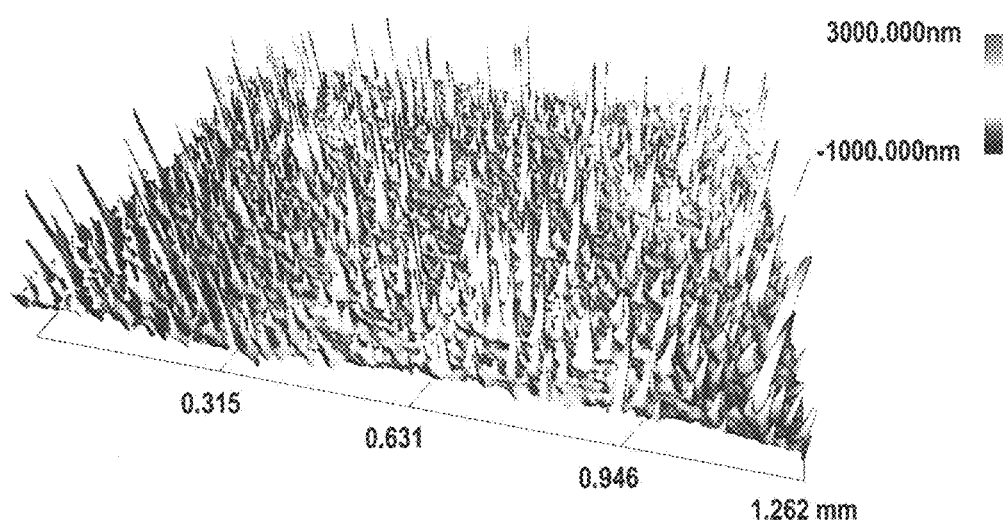
FIG. 8 is an illustrative surface plot of the topography of an exemplary inventive film that has had its covering layer (A) smoothed.

The peel film according to the present invention is characterized by outstanding winding behaviour, even after storage. It possesses a topography such as is shown in FIG. 8. According to the invention it is characterized by an arithmetic mean value of the absolute ordinate value $S_a$ of the covering layer (A) which is less than 300 nm and by a reduced peak height $S_{pk}$, which is less than 700 nm.

The adhesion between the biaxially oriented polyester film and the offline applied covering layer (A) (intra-layer bond strength) is so great that on peeling of the film from the meal tray the break preferentially takes place between the peel layer and the meal tray surface (adhesion break). This Definitions and Conventions Heat-sealable is understood to mean the property of a multilayer polyester film containing at least one base layer (B), which contains at least one heat-sealable covering layer (A), which can be bonded with a substrate of thermoplastic plastic, in particular APET/RPET and CPET meal trays, by means of sealing jaws by application of heat (110 to 200° C.) and pressure (1 to 6 bar) in a defined time (0.1 to 2 s), without the supporting layer (=base layer (B)) itself becoming plastic in the process. In order to achieve this, the polymer of the sealing layer in general has a markedly lower melting point than the polymer of the base layer. If for example polyethylene terephthalate with a melting point of 254° C. is used as the polymer for the base layer, then the melting point of the heat-sealable layer is in general markedly less than 230° C., in the present case preferably less than 200° C. and especially preferably less than 170° C.

Figure 2:
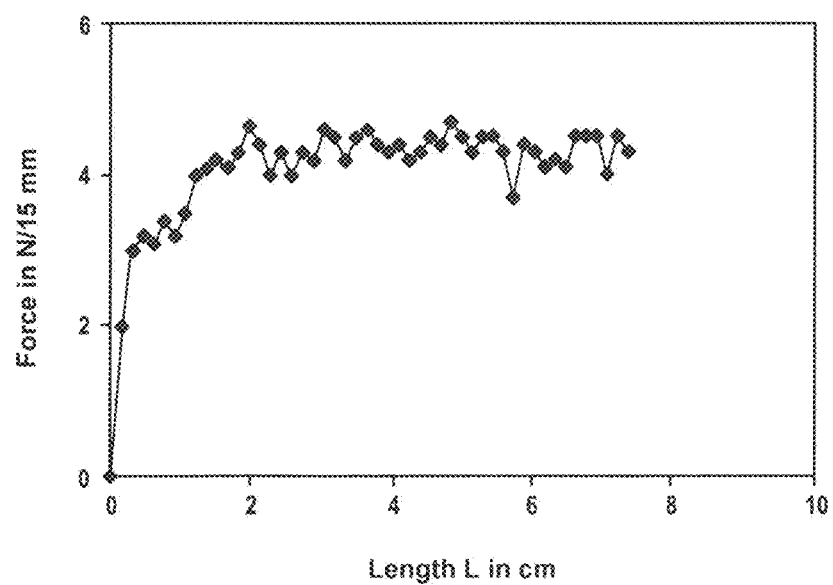
FIG. 2 is a graphical illustration of the tearing-elongation behavior of an exemplary film tested in accordance with FIG. 1.

Peelable is understood to mean the property of a polyester film which contains at least one heat-sealable and peelable covering layer (A), which after the heat-sealing onto APET/RPET- and CPET meal trays can pulled off again from the meal tray in such a manner that in the process the film tears neither internally nor away. During the pulling of the film off the meal tray, the composite of heat-sealable film and meal tray as a rule opens in the seam between the heat sealing layer and the meal tray surface (see also Ahlhaus, O. E.: Verpackung mit Kunststoffen [Packaging with Plastics], Carl Hanser Verlag, p. 271, 1997, ISBN 3-446-17711-6). During the peeling off of the film heat-sealed onto a test strip of the meal tray in a tensile strain test device at a peel angle of 180° corresponding to FIG. 1, a tearing-elongation behaviour of the film according to FIG. 2 is obtained. At the start of the peeling of the film from the substrate, the force necessary for this rises according to FIG. 2 to a certain value (e.g. 5 N/15 mm) and then remains approximately constant over the whole peel path, but is attended by more or less large fluctuations (ca. +/−20%).

Cold peel is understood to mean the property of a polyester peel film which does not lose its previously defined peelability after storage in the refrigerator at normal temperatures (2 to 8° C.). Normally, the cold peel behaviour is tested as follows: the heat-sealed pack is placed in the refrigerator and kept there for ca. 15 mins. The pack is taken out of the refrigerator and directly thereafter the film is pulled off the meal tray by hand. During this, it must peel completely, i.e. in this procedure it must neither split, nor tear internally, nor tear further. The magnitude of the peel force during this should correspond to "medium peel".

"Reworkability" is understood to mean the property of a polyester peel film that after heat-sealing it can be directly peeled off the meal tray again, without thereby losing its peelability. In the production of sealed packs, rejects are to be expected, e.g. a seal with defects. The defective tray is removed from the belt by the inspector on the line and the peel film pulled off the meal tray. The film has the property of being "reworkable" if it can thereby be completely pulled off the tray, without tearing in the process. After this, the meal tray is again either sealed with a hand device or place in the line for sealing. The procedure takes place at the room temperature of the machine hall (4 to 10° C.).

Integrity to water and to olive oil. The film exhibits the desired integrity if it has passed the so-called water and olive oil test. In this, before the heat-sealing the meal tray is filled with water or olive oil such that on standing the sealed meal tray vertically an approximately 3 cm high liquid layer acts on the seal seam. The film passes this test if after a storage time (on edge with 3 cm liquid column on the sealing layer) of at least 14 days, no liquid has flowed out.

In the context of the present invention, the following measurement methods were used for the characterization of the raw materials and the films:

Seal Seam Strength (Determination of the Peel Force)

For the determination of the seal seam strength, a film strip (100 mm long×15 mm wide) is laid on the inner side of a corresponding strip (this is cut out of the floor of the meal tray) of the APET/RPET meal tray and sealed at the set temperature of ≥110° C., a sealing time of 0.5 s and a "sealing pressure" of 460 N (sealing device HSG/ET from Brugger, sealing jaws heated on one side). In accordance with FIG. 2, after a period of ca. 2 h, the sealed strips are clamped into the tensile testing machine (e.g. Zwick) and the 180° seal strength, i.e. the force needed for separation of the test strips, determined with a peel speed of 200 mm/min. The seal seam strength is stated in N per 15 mm film strip (e.g. 3 N/15 mm).

Determination of the Minimum Sealing Temperature

As previously described in the measurement of the seal seam strength, heat-sealed samples (seal seam 15 mm×100 mm) are produced with the HSG/ET sealing machine from Brugger, wherein the film is sealed at different temperatures by means of two heated sealing jaws at a sealing pressure of 460 N and a sealing duration of 0.5 s. The 180° seal seam strength was measured as in the determination of the seal seam strength. The minimum sealing temperature is the temperature in ° C. at which a seal seam strength of at least 3 N/15 mm is obtained, wherein the minimum sealing temperature always lies over 80° C.

Glass Transition Temperatures $T_g$

The glass transition temperature $T_g$ was determined on the basis of film samples by means of DSC (Differential Scanning Calorimetry). A DSC 1090 from Perkin-Elmer was used. The heating rate was 20 K/min and the sample weight ca. 12 mg. In order to eliminate the thermal past history, the samples were firstly heated to 300° C., held for 5 minutes and then thereafter chilled with liquid nitrogen. From the thermogram, the temperature for the glass transition $T_g$ was taken as the temperature at half step height.

The Standard Viscosity SV

On the basis of DIN 53 728 Part 3, the standard viscosity in dilute solution SV was measured on a Ubbelohde viscometer at (25±0.05) ° C. Instead of a mixture of phenol and 1,2-dichlorobenzene, dichloroacetic acid (DCA) was used as the solvent. The concentration of the dissolved polymer was 1 g polymer/100 ml pure solvent. The dissolution of the polymer was effected for 1 hour at 60° C. If after this time the samples were not completely dissolved, up to two further dissolution attempts were made, each for 40 mins at 80° C. and the solutions then centrifuged for 1 hour at a revolution rate of 4100 rpm.

The dimensionless SV value is determined from the relative viscosity ($\eta rel=\eta/\eta s$) as follows:

$$SV=(\eta rel-1) \times 1000$$

The content of particles in the film or polymer raw material was determined by ash determination and corrected by correspondingly increasing the sample weighing, i.e.:

Sample weighing=(sample weighing corresponding to 100% polymer)/[(100 particle content in wt. %)/100)]

Haze, Clarity and Transparency

The measurement on the coated polyester films is performed on the haze-gard HAZEMETER® XL-211 from BYK Gardner. The haze according to Hölz was determined according to ASTM-D 1003-61, method 1. The measurement of the clarity takes place according to ASTM-D 1003 by means of haze-gard, but now on the "clarity port" of the measuring device. The measurement of the transparency takes place according to ASTM-D 1033-77.

Gloss 20°

The gloss is determined according to DIN 67530. The reflector value is measured as an optical characteristic value for the surface of a film. On the basis of the standards ASTM-D 523-78 and ISO 2813, the angle of incidence is set at 20°. A light beam impinges on the flat test surface at the set angle of incidence and is reflected and scattered by this. The light beams falling onto the photoelectronic receiver are displayed as proportional electrical quantities. The measurement value is dimensionless and must be stated with the angle of incidence.

E Modulus

The E modulus is determined according to ISO 527-1 and ISO 527-3, sample type 2, test speed 100%/min, 23° C., 50% r.h.

Shrinkage

The shrinkage of the film is measured according to DIN 40634 at a temperature of 150° C. and a shrinkage period of 15 mins.

Antifogging Properties

For the determination of the antifogging properties, 1 day after production of the peel film, firstly the surface tension of the seal side (A) in mN/m is measured. This takes place with the Krüss instrument DS 100 according to the use directions provided.

Determination of the Antimisting Action

The antimisting properties of the polyester films were determined as follows:

In a laboratory conditioned to 23° C. and 50% relative atmospheric humidity, film samples were welded onto a meal tray (length ca. 17 cm, width ca. 12 cm, height ca. 3 cm) of amorphous polyethylene terephthalate which contained ca. 50 ml water.

The trays are stored in a refrigerator temperature-controlled at 4° C. and withdrawn for assessment after 10 and 30 mins, and 4, 8 and 24 h. The formation of condensate on cooling of the warm air at 23° C. to refrigerator temperature was checked. A film provided with an effective antimisting agent is transparent even after condensate formation, since the condensate for example forms a coherent, transparent film. Without an effective antimisting agent, the formation of a fine droplet mist on the film surface leads to decreased transparency of the film; in the worst case, the contents of the meal tray are no longer visible.

A further test method is the so-called hot vapour or hot fog test. For this, a 250 ml beaker which contains 50 ml water and is covered with the film to be tested is placed in a water-bath temperature-controlled at 70° C. The assessment is the same as described above. In addition, with this test the long-term antimisting action or the wash-off resistance of the film can be tested, since the vapour constantly condenses on the film and runs off no drips off again. Readily soluble substances are thus washed off and the antimisting action declines.

Measurement of the Average Diameter $d_{50}$

The determination of the average diameter $d_{50}$ is performed with a Malvern MASTER SIZER® 2000 on the particles to be used.

For this, the samples are placed in a cuvette with water and these then placed in the measuring instrument. The dispersion is analysed by laser and the particle size distribution determined from the signal by comparison with a calibration curve. The particle size distribution is characterized by two parameters, the median value $d_{50}$ (=location measure for the mean value) and the dispersion measure, the so-called SPAIN98 (=measure for the dispersion of the particle diameter). The measurement process is automatic and also includes the mathematical determination of the $d_{50}$ value. The $d_{50}$ value here is by definition determined from the (relative) cumulated curve of the particle size distribution: the intersection point of the 50% ordinate value with the summation curve provides the desired $d_{50}$ value on the x axis.

Measurements on the film produced using these particles gave a $d_{50}$ value lower by 15-25% than the particles used.

Topography (White Light Interferometry)

The topography of the surface is determined with a while light interferometry microscope from Bruker, type Contour GT-K/A with the measurement software Vision 64 Version 5.6, according to ISO 16610-19 (ripple filtering) and ISO 25178-2 (roughness parameter). An area of 0.95 mm×1.27 mm (480×640 pixels) is measured at 5.1 times optical magnification. The film surface to be measured is vertically sputtered in the Sputter Coater POLARON® SC7680 with a layer of pure silver with the thickness of 10 nm in order to create an optimally reflecting layer for the measurement of the surface topography.

For the measurement a film piece of 10×10 cm size is stretched between two metal rings with the diameter of 4 cm, so that no ripple in the film sample is visually observable.

The measurement is performed in VSI mode (vertical scanning interferometry). All measurement parameters are set to the standard values supplied with the software, with the following exceptions: the measurement length in the z direction (=film thickness direction) is set at 25 m (BackscanLength=10 μm, ScanLength=15 μm). Under these standard measurement conditions (feed rate 1×, modulation threshold=5%), the proportion of unrecognized pixels is less than 10%. Missing measurement values on the flanks of the protrusions are supplemented by calculation (Data Restore).

All S parameters below are calculated from the S-F area. $S_a$ is the arithmetic mean value of the absolute ordinate values within the definition range (A):

$$S_a = \frac{1}{A} \int\int_A |z(x, y)| dx dy$$

The reduced peak height $S_{pk}$ is the average height of the projecting peaks above the core of the surface. The calculation rules for the Sa and Spk parameters are stated in the standard ISO 25178-2.

The $S_a$ and $S_{pk}$ values for a sample are mean values from 5 randomly selected different measurement sites. Should the $S_{pk}$ value at a measurement site be greater than 800 nm, the measurement is performed at a further 5 randomly selected measurement sites and all the measurement values for the sample are then taken into the mean values.

The invention is illustrated in more detail below on the basis of examples.

Example 1

I Production of the Biaxially Oriented Polyester Film

A biaxially oriented film with a thickness of 23 μm was produced from polyethylene terephthalate by the usual process (longitudinal-transverse stretching). For this, chips of polyethylene terephthalate were fed into the extruder for the base layer (B"). Likewise, chips of polyethylene terephthalate and particles were fed into the extruder (twin screw extruder) for the covering layer (B'). In accordance with the process conditions set out in the Table below, the raw materials were melted and homogenized in the two respective extruders.

Then the three melt streams for the layer (B") and the two covering layers (B') were layered over one another by coextrusion in a three-layer nozzle, and discharged via the nozzle cap. The resulting melt film was cooled and a transparent, three-layer film of B'B"B' structure of overall thickness 23 m was then produced by stepwise orientation in the longitudinal and transverse direction. The thicknesses of the two covering layers (B') are each 1 μm.

Coextruded Base Layer (B"):

| | |
|---|---|
| 100 wt. % | Polyethylene terephthalate with an SV value of 800 |

Both coextruded covering layers (B'), mixture of:

| | |
|---|---|
| 85 wt. % | Polyethylene terephthalate with an SV value of 790 |
| 15 wt. % | Masterbatch of 99 wt. % polyethylene terephthalate (SV value of 790) and 1.0 wt. % SYLOBLOC ® 44 H (synthetic SiO$_2$), d$_{50}$ = 2.5 μm |

The production conditions in the individual process steps were

| | | | | |
|---|---|---|---|---|
| Extrusion | Temperatures | B' layer | 280 | ° C. |
| | | B" layer | 280 | ° C. |
| | Temperature of withdrawal roller | | 20 | ° C. |
| Longitudinal stretching (NTEP) | Heating temperature | | 70-120 | ° C. |
| | Stretching temperature | | 115 | ° C. |
| | Longitudinal stretch ratio (LOE = 1.7 and REP = 2.65) | | 4.5 | |
| Transverse stretching | Heating temperature | | 100 | ° C. |
| | Stretching temperature | | 135 | ° C. |
| | Transverse stretch ratio | | 4.0 | |
| Fixing | Temperature | | 230 | ° C. |
| | Duration | | 3 | s |

II Production of the Coated Peel Film

The biaxially oriented polyester film was coated offline with a peel coating composition to form of the covering layer (A) with a gravure roller (forward gravure) in accordance with the information given below. After this, the smoothing of the covering layer (A) was effected with a "smoothing bar". The smoothing bar was driven at a speed which corresponds to 100% of the film web speed, which is however set in the opposite direction. The wrap angle here was 2°. The dry mass (=covering layer (A)) was 2.5 g/m$^2$.

Coating Composition (See Also Table 2 for this):

| | |
|---|---|
| 27.8 wt. % | Polyester (30 mol. % DMT units, 40 mol. % DMI units and 30 mol. % sebacate units and 44 mol. % EG and 56 mol. % neopentyl glycol). |
| 0.2 wt. % | SYLYSIA ® 430 (synthetic SiO$_2$, Fuji, Japan) with a particle diameter of d$_{50}$ = 3.4 μm |
| 2 wt. % | Antifogging agent, diethyl sulphosuccinate sodium salt (LUTENSIT ® A BO BASF SE) |
| 70 wt. % | Ethyl acetate |

The glass transition point of the polyester lies at 11° C. and the SV value of the polyester lies at 500. The viscosity of the lacquer was 25 s and the temperature of the lacquer was 19.5° C.

The respective contents in mol. % of the dicarboxylic acids and glycols contained in the peel polymer and further information on the film according to the invention are stated in Table 2.

Figure 3:
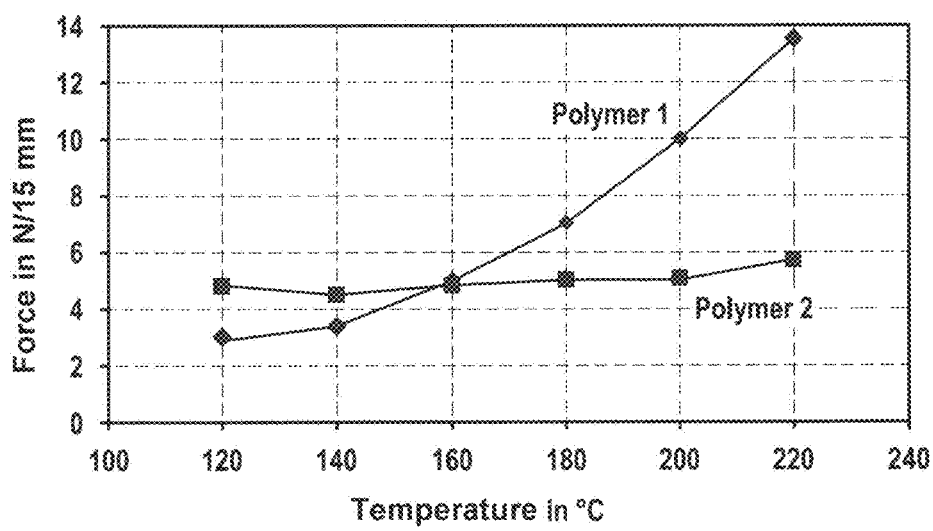
FIG. 3 is a graphical illustration of peel force rising strongly with the heat sealing temperature.

The properties of the film are shown in Table 3. According to measurements (column 2), the minimum sealing temperature of the film towards APET and RPET meal trays is 120° C. The film was sealed onto APET meal trays (manufacturer Faerch K2171-1A transparent) at 120, 130, 140 and 150° C. (sealing pressure 460 N, sealing time 0.5 s). Next, strips of the composite of film according to the invention and APET meal tray were pulled apart by means of stress-strain testers according to the aforesaid measurement procedure. For all sealing temperatures, the desired peeling of the films off the meal tray according to FIG. 3 (polymer 2) was seen.

The measured seal seam strengths are listed in column 3. For all sealing temperatures, peelable films were obtained. The so important cold peel behaviour was also faultless. At just 5 N/15 mm, the seal seam strengths lie in the medium range, i.e. that the films can be pulled away from the meal tray with controlled exertion of force (=medium peel). Furthermore, the film had the required good optical properties, and showed the desired handling, the desired processing behaviour and the desired winding behaviour.

Example 2

In comparison to example 1, the dry mass of the sealable layer (A) was raised from 2.5 g/m$^2$ to 3.5 g/m$^2$ with otherwise identical film structure and otherwise identical mode of production. The minimum sealing temperature of the film onto APET and RPET meal trays is now 116° C. For all sealing temperatures, the desired peeling of the films from the meal tray according to FIG. 3 (polymer 2) was seen. The measured seal seam strengths are listed in column 3. For all sealing temperatures, peelable, i.e. also cold peelable films were once again obtained. The seal seam strengths of the film according to the invention are higher than in Example 1. However they always still lie in a range where the film can pulled from the meal tray without great exertion of force. A somewhat higher haze of the film was measured; the handling and the processing behaviour of the film was as in Example 1. The peel film according to this example is admittedly more expensive than the peel film according to Example 1, but it has the advantage that with this difficult to seal meal trays from Infia (slightly cloudy) can be firmly sealed.

Example 3

In comparison to Example 1, the dry mass of the sealable layer (A) was raised from 3.5 g/m$^2$ to 4.5 g/m$^2$ with otherwise identical film structure and otherwise identical mode of production. The minimum sealing temperature of the film onto APET and RPET meal trays is now 111° C. For all sealing temperatures, the desired peeling of the films from the meal tray according to FIG. 3 was seen (polymer 2). The measured seal seam strengths are listed in column 3. For all sealing temperatures, peelable, i.e. also cold peelable films were once again obtained. The seal seam strengths of the film according to the invention are markedly higher than in Example 1. Once again, a somewhat higher haze of the film was measured; the handling and the processing behaviour of the film was as in Example 1. The peel film according to this example has the advantage that with this difficult to seal meal trays, which are in particular to be encountered with RPET, can be sealed.

Example 4

In comparison to Example 1, with otherwise identical film structure, the composition of the lacquer for the sealable covering layer (A) was modified. The lacquer now consists of the following raw material contents

| | |
|---|---|
| 27.8 wt. % | Polyester (45 mol. % DMT units, 32 mol. % DMI units, 10 mol. % sebacate and 13 mol. % adipate units and 35 mol. % EG units, 25 mol. % DEG units, 15 mol. % PD units, 6 mol. % BD units and 19 mol. % neopentyl glycol units). |
| 0.2 wt. % | SYLYSIA ® 430 (synthetic $SiO_2$, Fuji, Japan) with a particle diameter of $d_{50}$ = 3.4 μm |
| 2 wt. % | Antifogging agent, LUTENSIT ® A BO BASF SE |
| 70 wt. % | Ethyl acetate |

The minimum sealing temperature of the film towards APET meal trays is now 113° C. For all sealing temperatures, the desired peeling of the films from the meal tray according to FIG. 3 was seen (polymer 2). The measured seal seam strengths are listed in column 3. For all sealing temperatures, once again peelable films were obtained. The seal seam strengths of the film according to the invention are higher than in Example 1. They lie in a medium range, so that the film can be pulled off the meal tray without significant exertion of force. The handling, the processing behaviour and in particular the winding behaviour of the film was as in Example 1.

Comparative Example 1

In comparison to Example 1, Example 1 from EP 1 475 228 B1 was reworked.

The properties of the film are shown in Table 3. Although the film is highly pigmented and the pigments are weak points in the sealing layer, a peelable film was obtained for none of the stated sealing temperatures. On peeling the film off the meal tray, the film tore directly and exhibited a force-path diagram according to FIG. 3b. The film exhibits "weldable" behaviour and is thus unsuitable for solution of the stated problem.

Comparative Example 2

In comparison to Example 1, under otherwise identical conditions, the coating (A) was applied without subsequent smoothing, i.e. without "smoothing bar".

During the winding of the coated film and subsequent test unwinding of the peel film from the roll, a marked unwinding noise was observed. On cutting of the master roll into small cutter rolls for client use, intensified adhesion of the film layers to one another was observed. Owing to the major adhesion between the individual film layers, film breaks in the machine occurred, which leads to stoppage of the cutting operation. The winding behaviour of the peel film is unsatisfactory and does not meet the requirements.

The film is characterized by a topography of the covering layer (A) as shown in FIG. 10. In the surface plot for the covering layer (A), as well as the "usual protrusions", additional protrusions can be seen, which are many times greater in their diameter than the peaks surrounding them.

TABLE 2

| | | Composition of polyester for formation of covering layer (A) | | | | | | | | | | Glass temperature polyester ° C. | SV value polyester | Film structure | Film thickness, ca. μm | Mass of covering layer (A) g/m² | Antifogging agent and concentration in layer (A) | Particles in B' of the biaxially oriented polyester film | |
|---|---|---|---|---|---|---|---|---|---|---|---|---|---|---|---|---|---|---|---|
| | | Dicarboxylic acids Mol. % | | | | | Diols Mol. % | | | | | | | | | | | Diameter μm | Concentration Wt. % |
| | | DMT | DMI | AZA | SeA | AdA | EG | DEG | PD | 1,2-BD | NG | | | | | | | | |
| Examples | 1 | 30 | 40 | | 30 | | 44 | | | | 56 | 11 | 500 | AB | 25 | 2.5 | Lutensit A BO BASF SE/2 | 3.4 | 0.20 |
| | 2 | 30 | 40 | | 30 | | 44 | | | | 56 | 11 | 500 | AB | 25 | 3.5 | Lutensit A BO BASF SE/2 | 3.4 | 0.20 |
| | 3 | 30 | 40 | | 30 | | 44 | | | | 56 | 11 | 500 | AB | 25 | 4.5 | Lutensit A BO BASF SE/2 | 3.4 | 0.20 |
| | 4 | 45 | 32 | | 10 | 13 | 35 | 25 | 15 | 7 | 18 | 12 | 500 | AB | 25 | 2.5 | Lutensit A BO BASF SE/2 | 3.4 | 0.20 |
| | 1 | | | | | | | | | | | 75 | | ABC | 25 | 1 | | 3.4 | 5 |
| | 2 | 30 | 40 | | 30 | | 44 | | | | 56 | 11 | 500 | AB | 25 | 2.5 | Lutensit A BO BASF SE/2 | 3.4 | 0.20 |

DMT Dimethyl terephthalate, DMI Dimethyl isophthalate, EG ethanediol, DEG diethylene glycol, PD propanediol, BD butanediol, NG neopentyl glycol
AzA azelate, SeA sebacate, AdA adipate

TABLE 3

| | | Minimum sealing temperature °C. | Seal seam strength toward APET meal trays at temperature in °C. | | | | Cold-peel and Rework-ability | Haze % | Clarity % | Gloss | |
|---|---|---|---|---|---|---|---|---|---|---|---|
| | | | 120 | 130 | 140 | 150 | | | | A side | B side |
| | | | | N/15 nm | | | | | | | |
| Examples | 1 | 120 | 4.2 | 4.7 | 5.2 | 4.8 | ++++ | 11 | 92 | 75 | 130 |
| | 2 | 116 | 4.9 | 5.7 | 5.8 | 5.8 | ++++ | 12 | 91 | 74 | 130 |
| | 3 | 111 | 6.4 | 6.5 | 6.9 | 6.2 | ++++ | 13 | 88 | 73 | 130 |
| | 4 | 113 | 5 | 5.2 | 5.7 | 5.6 | ++++ | 10 | 91 | 79 | 130 |
| | 5 | | | | | | | | | | |
| Comp. examples | 1 | 130 | 1.7 | 2.5 | 5 | 8 | – | 23 | 85 | 55 | 130 |
| | 2 | 120 | 4.2 | 4.7 | 5.2 | 4.8 | ++++ | 12 | 91 | 74 | 130 |

| | | Trans-parency % | Arithmetic mean value of the absolute ordinate values $S_a$ | | Reduced peak height $S_{pk}$ | E modulus N/mm² | Shrinkage % | Anti-fogging behaviour | Water and oil test | Winding behaviour |
|---|---|---|---|---|---|---|---|---|---|---|
| | | | A-side nm | B-side nm | A-side nm | | | | | |
| Examples | 1 | 90.5 | 135 | 60 | 551 | 4500 | 2.1 | good pass | pass | very good |
| | 2 | 90.2 | 175 | 60 | 581 | 4300 | 2.1 | good pass | pass | very good |
| | 3 | 90.1 | 230 | 60 | 622 | 4200 | 2 | good pass | pass | very good |
| | 4 | 90.8 | 136 | 60 | 551 | 4600 | 2.1 | good pass | pass | very good |
| | 5 | | | | | | | | | |
| Comp. examples | 1 | | 130 | 60 | | | | | | very good |
| | 2 | 90 | 430 | 60 | 1051 | 4500 | 2.1 | good pass | pass | mangelnft |

Cold peel ++++ At all sealing temperature, film is "peeled" from the menu tray, without in the process the film tearing or tearing further. Faultless, full, clean peeling of the film from menu tray, even in the upper termperature range with high seal seam strength (medium peel).
– at all sealing temperatures, the film tears during peeling from the meal tray.

That which is claimed:

1. Transparent, peelable polyester film comprising at least one biaxially oriented polyester film having a base layer (B) and at least one peelable covering layer (A) coated thereon offline, wherein the covering layer (A) is made up of at least 85 wt. % of a polyester of aromatic and aliphatic dicarboxylic acids and aliphatic diols,
said aromatic dicarboxylic acid present in an amount ranging from 25 to 95 mol %,
and wherein the arithmetic mean value of the absolute ordinate values $S_a$ of the covering layer (A) is less than 300 nm and the reduced peak height $S_{pk}$ of the covering layer (A) is less than 700 nm, and said film has a sealing onset temperature of not more than 120° C.,
wherein the peelable polyester of the covering layer (A) contains the following units derived from dicarboxylic acid and units derived from diol, respectively based on the total content of dicarboxylic acid-based and diol-based repeating units:
25 to 85 mol. % terephthalate,
5 to 50 mol. % isophthalate,
5 to 50 mol. % adipate,
0 to 30 mol. % azelate,
5 to 50 mol. % sebacate,
more than 10 mol. % ethylene glycol, and
more than 10 mol. % of one or more selected from the group consisting of: $C_3$ to $C_7$ diols, and di-, tri- or tetra-$C_2$ to $C_4$ alkylene glycols.

2. Polyester film according to claim 1, wherein said film exhibits shrinkage of not greater than 2.5%.

3. Polyester film according to claim 2, wherein the arithmetic mean value of the absolute ordinate values $S_a$ of the covering layer (A) is less than 250 nm and the reduced peak height $S_{pk}$ is less than 690 nm.

4. Polyester film according to claim 3, wherein the arithmetic mean value of the absolute ordinate values $S_a$ of the covering layer (A) is less than 200 nm and the reduced peak height $S_{pk}$ is less than 680 nm.

5. Polyester film according claim 4, wherein the covering layer (A) contains further substances selected from the group consisting of particles, additives, auxiliary agents, lubricants, antifogging agents and mixtures thereof.

6. Polyester film according to claim 5, wherein the total thickness of the polyester film is 3 to 200 μm, and the layer (B) has a content of 45 to 97% in the total thickness.

7. Polyester film according to claim 6, wherein the total thickness of the polyester film is 4 to 150 μm.

8. Polyester film according to claim 6, wherein the total thickness of the polyester film is 5 to 100 μm.

9. Polyester film according to claim 8, wherein the film has a sealing onset temperature or minimum sealing temperature towards APET and RPET meal trays of not more than 115° C., a max. sealing temperature of ca. 160° C. and a seal seam strength or peel force towards APET and RPET meal trays of at least 3.0 N.

10. Polyester film according to claim 1, wherein the glass transition temperature of the peelable polyester of the covering layer (A) lies between 0 and 30° C.

11. Polyester film according to claim 1, wherein said diols consist of aliphatic diols comprising from more than 10 mol % up to 44 mol % ethylene glycol.

12. Polyester film according to claim 11, wherein said peelable layer (A) comprises a mixture of ethylene glycol, propylene glycol, butylene glycol, neopentyl glycol and diethylene glycol.

13. Polyester film according to claim 11, wherein the diols comprise neopentyl glycol in an amount ranging from 18 to 56 mol %, and the film exhibits a seal seam strength or peel force towards APET and RPET meal trays of 3 to 7 N per 15 mm strip width.

14. Polyester film according to claim 1, contains from 0.5 to 10 wt % particles having a particle diameter, $d_{50}$, ranging from 2.0 to 8,
the covering layer (A) has a mass ranging from 1 to 5 $g/m^2$,
the arithmetic mean value of the absolute ordinate values $S_a$ of the covering layer (A) is less than 250 nm and the reduced peak height $S_{pk}$ of the covering layer (A) is less than 690 nm.

15. Polyester film according to claim 14, wherein the particles within the covering layer (A) have a diameter/layer thickness ratio of at least 1.2.

16. Polyester film according to claim 14, wherein the base layer (B) comprises three layers, with two outer base layers disposed on opposing sides of a middle base layer and said outer base layers comprising particles.

17. Sealing film comprising the polyester film as claimed in claim 1.

18. Sealing film for APET and/or RPET meal trays comprising the polyester film as claimed in claim 1.

19. Process for production of the polyester film according to claim 1, comprising
producing at least one base layer (B) via extruding, biaxially stretching, thermofixing and winding the same,
applying a wet peel coating composition for forming the covering layer (A) onto the base film (B) by coating,
smoothing the coated polyester film on the coated side (A) via a rotating roller and
drying and winding the coated polyester film.

20. Process according to claim 19, wherein the rotating roller has a smooth surface and the roller is driven in the same or the opposite direction to the film web direction.

21. Process according to claim 20, wherein the rotating roller has a smooth surface and the roller is driven in the opposite direction to the film web direction.

22. Process according to claim 19, wherein the speed of the rotating roller is 20 to 200% of the film speed and the film has a wrap angle in the range from 0 to 90°.

23. Process according to claim 22, wherein the wrap angle of the film is in the range from 0 to 45°.

24. Process according to claim 22, wherein the wrap angle of the film is in the range from 0 to 20°.

25. Process according to claim 19, wherein the rotating roller has a diameter from 2 to 8 cm.

26. Process according to claim 19, wherein the viscosity of the peel coating composition, measured in a bath and in a feed tank by means of a DIN 4 flow cup, is 10 to 50 s.

27. Process according to claim 26, wherein the viscosity of the peel coating composition is 16 to 32 s.

28. Process according to claim 26, wherein the viscosity of the peel coating composition is 17 to 30 s.

29. Process according to claim 19, wherein the temperature of the peel coating composition, measured in a bath and a feed tank, is 10 to 40° C.

30. Process according to claim 29, wherein the temperature of the peel coating composition is 16 to 28° C.

31. Process according to claim 29, wherein the temperature of the peel coating composition is 18 to 25° C.

\* \* \* \* \*

UNITED STATES PATENT AND TRADEMARK OFFICE
CERTIFICATE OF CORRECTION

PATENT NO. : 11,465,396 B2
APPLICATION NO. : 15/808329
DATED : October 11, 2022
INVENTOR(S) : Peiffer et al.

It is certified that error appears in the above-identified patent and that said Letters Patent is hereby corrected as shown below:

On the Title Page

Column 2, Item [57], Abstract
Line 8, delete "values Sb" and insert --values Sa--

In the Claims

Column 32
Claim 3, Line 37, delete "claim 2" and insert --claim 1--
Claim 5, Line 45, delete "claim 4" and insert --claim 1--
Claim 6, Line 49, delete "claim 5" and insert --claim 1--
Claim 9, Line 56, delete "claim 8" and insert --claim 1--

Column 33
Claim 14, Line 10, after "claim 1" insert --where in the covering layer (A)--

Signed and Sealed this
Twentieth Day of December, 2022

Katherine Kelly Vidal
*Director of the United States Patent and Trademark Office*